United States Patent [19]
Nolan et al.

[11] Patent Number: 6,047,380
[45] Date of Patent: *Apr. 4, 2000

[54] MICROCONTROLLER WAKE-UP FUNCTION HAVING AN INTERLEAVING PRIORITY SCHEME FOR SAMPLING A PLURALITY OF ANALOG INPUT SIGNALS

[75] Inventors: James Nolan, Chandler, Ariz.; Brian Dellacroce, Colorado Springs, Colo.

[73] Assignee: Microchip Technology Incorporated, Chandler, Ariz.

[ * ] Notice: This patent is subject to a terminal disclaimer.

[21] Appl. No.: 08/986,474

[22] Filed: Dec. 8, 1997

Related U.S. Application Data

[63] Continuation-in-part of application No. 08/530,752, Sep. 19, 1995, abandoned.

[51] Int. Cl.[7] .................................. G06F 1/32; G06F 3/05
[52] U.S. Cl. .......................... 713/324; 713/323; 713/502; 341/141
[58] Field of Search ................................ 710/18, 60, 300, 710/323, 324, 502; 341/141, 164, 169, 48

[56] References Cited

U.S. PATENT DOCUMENTS

| | | | |
|---|---|---|---|
| 4,473,901 | 9/1984 | Jensen | 370/520 |
| 4,811,285 | 3/1989 | Walker et al. | 365/45 |
| 4,914,699 | 4/1990 | Dunn et al. | 375/202 |
| 5,294,928 | 3/1994 | Cooper et al. | 341/142 |
| 5,423,045 | 6/1995 | Kannan et al. | 713/321 |
| 5,619,430 | 4/1997 | Nolan et al. | 702/63 |
| 5,760,720 | 6/1998 | Nolan et al. | 341/120 |
| 5,774,733 | 6/1998 | Nolan et al. | 713/323 |
| 5,841,996 | 11/1998 | Nolan et al. | 710/129 |

*Primary Examiner*—Xuan M. Thai
*Attorney, Agent, or Firm*—Paul N. Katz; Ronald L. Chichester; Frohwitter

[57] ABSTRACT

A semiconductor device for receiving analog input signals includes a microprocessor for processing signal information. The microprocessor is put in a sleep mode when not called upon to process signal information, and is either left in that mode or awakened depending on the level of a continuously variable analog input signal relative to a programmed threshold level. If the relative levels of the analog input signal and the programmed threshold level result in the microprocessor being awakened, information contained in the analog input signal is processed to initiate a selected action. In typical applications, the semiconductor device performs a control function, such as to control the operation of an external circuit in response to information from at least one continuously variable analog input signal derived from the external circuit. The microprocessor, when awakened, assists in controlling the external circuit to restore that analog input signal to a predetermined level distinct from the threshold level. In some applications, such as for battery charging and monitoring, the device is responsive to a plurality of different continuously variable analog input signals derived from the external circuit and indicative of a specified circuit function thereof. These signals are applied to the device in interleaved sequence according to a priority that depends on their respective rates of variation. The specified circuit function of the external circuit such as the level of charge on a battery is monitored, and the degree of control exercised by the device over the external circuit such as halting a charging of the battery based on level of charge, is a function of the designated priority of the plurality of analog input signals.

13 Claims, 19 Drawing Sheets

| CONV # | $t_{rel}$ | $t_{obs}$ | INTERLEAVE CHANNEL | A/Q CHANNEL |
|---|---|---|---|---|
| 0 | 16mS | mS | RUN SEQUENCE ON CURRENT INPUT CHANNEL | $Bott_{in}$ |
| 1 | 16mS | mS | RUN SEQUENCE ON $V_{refhi}$ CHANNEL | $V_{refhi}$ |
| 2 | 16mS | mS | RUN SEQUENCE ON CURRENT INPUT CHANNEL | $Bott_{in}$ |
| 3 | 16mS | mS | RUN SEQUENCE ON $V_{reflo}$ CHANNEL | $V_{reflo}$ |
| 4 | 16mS | mS | RUN SEQUENCE ON CURRENT INPUT CHANNEL | $Bott_{in}$ |
| 5 | 16mS | mS | RUN SEQUENCE ON BANDGAP CHANNEL | $V_{bg}$ |
| 6 | 16mS | mS | RUN SEQUENCE ON CURRENT INPUT CHANNEL | $Bott_{in}$ |
| 7 | 16mS | mS | RUN SEQUENCE ON $V_{in}$ CHANNEL | $VBott_{in}$ |
| 8 | 16mS | mS | RUN SEQUENCE ON CURRENT INPUT CHANNEL | $Bott_{in}$ |
| 9 | 16mS | mS | RUN SEQUENCE ON CURRENT ZERO CHANNEL | $I_{zero}$ |
| 10 | 16mS | mS | RUN SEQUENCE ON CURRENT INPUT CHANNEL | $Bott_{in}$ |
| 11 | 16mS | mS | RUN SEQUENCE ON THERMISTOR CHANNEL | $T_{int}$ |
| 12 | 16mS | mS | RUN SEQUENCE ON CURRENT INPUT CHANNEL | $Bott_{in}$ |
| 13 | 16mS | mS | RUN SEQUENCE ON EXTERNAL THERMISTOR CHANNEL | $T_{ext}$ |
| 14 | 16mS | mS | RUN SEQUENCE ON CURRENT INPUT CHANNEL | $Bott_{in}$ |
| 15 | 16mS | mS | RUN SEQUENCE ON $V_{in}$ CHANNEL | $BotV_{in}$ |

| PARAMETER | SYM. | UNITS | MIN/MAX | ADD. | FORMAT |
|---|---|---|---|---|---|
| SLOPE REFERENCE | $K_{ref}$ | UNITLESS RATIO | 0.1/ 0.15 | OFD0 h - OFC3 h | 32-BIT FLOATING POINT* |
| BANDGAP REFERENCE VOLTAGE | $K_{bg}$ | VOLTS | 0.1/ 0.5 | OFD4 h - OFC7 h | 32-BIT FLOATING POINT |
| TEMPERATURE SENSOR VOLTAGE @ 180 DEGREES | $K_{thrm}$ | VOLTS | 0.0/ 1.0 | OFCB h - OFCB h | 32-BIT FLOATING POINT |
| TEMPERATURE SENSOR VOLTAGE COEFFICIENT | $K_{tc}$ | VOLTS/ DEGREE CELSIUS | 0.001/ 0.0010 | OFCC h - OFCF h | 32-BIT FLOATING POINT |
| INTERNAL MAIN OSCILLATOR FREQUENCY | $F_{osc}$ | X* 10KHZ +3.0MHZ | | OFD0 h | BYTE |
| WDT FREQUENCY (OPTIONAL) | $F_{wdt}$ | HZ | 25-200 | OFD2 h | BYTE |

FIG. 4

| CONV # | $f_{rel}$ | $f_{obs}$ | INTERLEAVE CHANNEL | A/Q CHANNEL |
|---|---|---|---|---|
| 0 | 16mS | mS | RUN SEQUENCE ON CURRENT INPUT CHANNEL | $BofI_{in}$ |
| 1 | 16mS | mS | RUN SEQUENCE ON $V_{refhi}$ CHANNEL | $V_{refhi}$ |
| 2 | 16mS | mS | RUN SEQUENCE ON CURRENT INPUT CHANNEL | $BofI_{in}$ |
| 3 | 16mS | mS | RUN SEQUENCE ON $V_{reflo}$ CHANNEL | $V_{reflo}$ |
| 4 | 16mS | mS | RUN SEQUENCE ON CURRENT INPUT CHANNEL | $BofI_{in}$ |
| 5 | 16mS | mS | RUN SEQUENCE ON BANDGAP CHANNEL | $V_{bg}$ |
| 6 | 16mS | mS | RUN SEQUENCE ON CURRENT INPUT CHANNEL | $BofI_{in}$ |
| 7 | 16mS | mS | RUN SEQUENCE ON $V_{in}$ CHANNEL | $VBof_{in}$ |
| 8 | 16mS | mS | RUN SEQUENCE ON CURRENT INPUT CHANNEL | $BofI_{in}$ |
| 9 | 16mS | mS | RUN SEQUENCE ON CURRENT ZERO CHANNEL | $I_{zero}$ |
| 10 | 16mS | mS | RUN SEQUENCE ON CURRENT INPUT CHANNEL | $BofI_{in}$ |
| 11 | 16mS | mS | RUN SEQUENCE ON THERMISTOR CHANNEL | $T_{int}$ |
| 12 | 16mS | mS | RUN SEQUENCE ON CURRENT INPUT CHANNEL | $BofI_{in}$ |
| 13 | 16mS | mS | RUN SEQUENCE ON EXTERNAL THERMISTOR CHANNEL | $T_{ext}$ |
| 14 | 16mS | mS | RUN SEQUENCE ON CURRENT INPUT CHANNEL | $BofI_{in}$ |
| 15 | 16mS | mS | RUN SEQUENCE ON $V_{in}$ CHANNEL | $BofV_{in}$ |

FIG. 5

| LOACx<7:3> | | | | | NOMINAL OUTPUT VOLTAGE RANGE (V) | SENSE CURRENT RANGE (WITH 0.5 ohm SENSE RESISTOR)-mA |
|---|---|---|---|---|---|---|
| 0 | 0 | 0 | 0 | 0 | 0.5000-0.5050 | 0-100 |
| 0 | 0 | 0 | 0 | 1 | 0.5050-0.5100 | 100-200 |
| 0 | 0 | 0 | 1 | 0 | 0.5100-0.5150 | 200-300 |
| 0 | 0 | 0 | 1 | 1 | 0.5150-0.5200 | 300-400 |
| 0 | 0 | 1 | 0 | 0 | 0.5200-0.5250 | 400-500 |
| 0 | 0 | 1 | 0 | 1 | 0.5250-0.5300 | 500-600 |
| 0 | 0 | 1 | 1 | 0 | 0.5300-0.5350 | 600-700 |
| 0 | 0 | 1 | 1 | 1 | 0.5350-0.5400 | 700-800 |
| 0 | 1 | 0 | 0 | 0 | 0.5400-0.5450 | 800-900 |
| 0 | 1 | 0 | 0 | 1 | 0.5450-0.5500 | 900-1000 |
| 0 | 1 | 0 | 1 | 0 | 0.5500-0.6000 | 1000-2000 |
| 0 | 1 | 0 | 1 | 1 | 0.6000-0.6500 | 2000-3000 |
| 0 | 1 | 1 | 0 | 0 | 0.6500-0.7000 | 3000-4000 |
| 0 | 1 | 1 | 0 | 1 | 0.7000-0.7500 | 4000-5000 |
| 0 | 1 | 1 | 1 | 0 | 07500-0.8000 | 5000-6000 |
| 0 | 1 | 1 | 1 | 1 | 0.8000-0.8500 | 6000-7000 |
| 1 | 0 | 0 | 0 | 0 | 0.4950-0.5000 | 0-(100) |
| 1 | 0 | 0 | 0 | 1 | 0.4900-0.4950 | (100)-(200) |
| 1 | 0 | 0 | 1 | 0 | 0.4850-0.5900 | (200)-(300) |
| 1 | 0 | 0 | 1 | 1 | 0.4800-0.4850 | (300)-(400) |
| 1 | 0 | 1 | 0 | 0 | 0.4750-0.4800 | (400)-(500) |
| 1 | 0 | 1 | 0 | 1 | 0.4700-0.4750 | (500)-(600) |
| 1 | 0 | 1 | 1 | 0 | 0.4650-0.7000 | (600)-(700) |
| 1 | 0 | 1 | 1 | 1 | 0.4600-0.4650 | (700)-(800) |
| 1 | 1 | 0 | 0 | 0 | 0.4550-0.4600 | (800)-(900) |
| 1 | 1 | 0 | 0 | 1 | 0.4500-0.4550 | (900)-(1000) |
| 1 | 1 | 0 | 1 | 0 | 0.4000-0.4500 | (1000)-(2000) |
| 1 | 1 | 0 | 1 | 1 | 0.3500-0.4000 | (2000)-(3000) |
| 1 | 1 | 1 | 0 | 0 | 0.3000-0.3500 | (3000)-(4000) |
| 1 | 1 | 1 | 0 | 1 | 0.2500-0.3000 | (4000)-(5000) |
| 1 | 1 | 1 | 1 | 0 | 0.2000-0.2500 | (5000)-(6000) |
| 1 | 1 | 1 | 1 | 1 | 0.1500-0.2000 | (6000)-(7000) |

*FIG. 9*

| LOACx<2:0> | | | FRACTIONAL VALUE OF THE COARSE RANGE |
|---|---|---|---|
| 0 | 0 | 0 | 1/8 |
| 0 | 0 | 1 | 1/4 |
| 0 | 1 | 0 | 3/8 |
| 0 | 1 | 1 | 1/2 |
| 1 | 0 | 0 | 5/8 |
| 1 | 0 | 1 | 3/4 |
| 1 | 1 | 0 | 7/8 |
| 1 | 1 | 1 | MAXIMUM |

FIG. 10

| 90h | B7 | B6 | B5 | B4 | B3 | B2 | B1 |
|---|---|---|---|---|---|---|---|
| CHGCON | U | CCDMPB | R | CPOLB | U | CCDMPA | CCAEN |
| READ/WRITE | — | R | R/W | R/W | — | R | R/W |
| PDR VALUE D0h | 0 | 0 | 0 | 0 | 0 | 0 | 0 |

| | | |
|---|---|---|
| B7 | — | UNIMPLEMENTED. READ AS '0'. |
| B6 | CCOMPB | CHARGE CONTROL COMPARATOR OUTPUT B. READING THIS BIT RETURNS THE STATUS OF THE CHARGE CONTROL/WAKE-UP COMPARATOR B OUTPUT. WRITES TO THIS BIT: HAVE NO EFFECT |
| B5 | R | RESERVED. THIS BIT SHOULD BE POGRAMMED AS '0'. USE OF THIS BIT AS A GENERAL PURPOSE READ/WRITE BIT IS NOT RECOMMENDED, SINCE THIS MAY AFFECT UPWARD COMPATIBILITY WITH FUTURE PRODUCTS. |
| B4 | CPDLB | CHARGE CONTROL POLARITY BIT B 1=INVERT THE OUTPUT FROM THE CHARGE/WKE-UP COMPARATOR B. 0=ODD DO NOT INVERT THE OUTPUT FROM THE CHARGE/WAKE-UP COMPARATOR B. (DEFAULT) |
| B3 | — | UNIMPLEMENTED. READ AS '0' |

*FIG. 11A*

| | | |
|---|---|---|
| B2 | CCOMPA | CHARGE CONTROL COMPARATOR OUTPUT A. READING THIS BIT RETURNS THE STATUS OF THE CHARGE CONTROL/WAKE-UP COMPARATOR A OUTPUT. WRITES TO THIS BIT: HAVE NO EFFECT |
| B1 | CPAEN | CHARGE CONTROL FUNCTION ENABLE BIT. 1=CHARGE CONTROL IS ENABLED. CFILT AND CCTRL ARE USED TO CONTROL SWITCHING REGULATOR, 0=CHARGE CONTROL IS DISABLED (DEFAULT). CFILT AND /CCTRL ASSUME NORMAL PORTC FUNCTION |
| B0 | CPDLA | CHARGE CONTROL POLARITY BIT A. 1=INVERT THE OUTPUT FROM THE CHARGE/WKE-UP COMPARATOR A. 0=ODD DO NOT INVERT THE OUTPUT FROM THE CHARGE/WAKE-UP COMPARATOR A. (DEFAULT) |

*FIG. 11B*

| COMMAND | MAPPING (msb...fsb) | DATA |
|---|---|---|
| LOAD TEST | X X 0 0 0 X | START_BIT, DATA 140, STOP_BIT |
| LOAD DATA | X X 0 0 1 X | START_BIT, DATA 140, STOP_BIT |
| READ DATA | X X 0 1 0 X | START_BIT, DATA 140, STOP_BIT |
| INCREMENT ADDRESS | X X 0 1 1 X | |
| BEGIN PROGRAMMING | X X 1 0 0 X | |
| BEGIN PARALLEL MODE | X X 1 0 1 X | |
| END PROGRAMING | X X 1 1 1 X | |

MICROCONTROLLER WAKE-UP FUNCTION HAVING AN INTERLEAVING PRIORITY SCHEME FOR SAMPLING A PLURALITY OF ANALOG INPUT SIGNALS

CROSS-REFERENCE TO RELATED APPLICATIONS

This application is a continuation-in-part of patent application Ser. No. 08/530,752 entitled "Microcontroller Wake-Up Function Having Digitally Programmable Threshold", of the same inventors, filed on Sep. 19, 1995, now abandoned.

BACKGROUND OF THE INVENTION

The present invention relates generally to wake-up functions for electronic circuits and, more particularly, to waking-up a microprocessor of a battery-operated semiconductor device from a sleep mode in response to an analog input signal exceeding a digitally programmed threshold level.

Certain semiconductor devices such as microcontrollers generally include a microprocessor core embedded with other components, such as timer circuits and ROM and RAM memory, on an integrated circuit (IC) chip. Microcontrollers are used in various applications, in hand held instruments, for example, such as tiny pocket-sized pagers, where the microcontroller interprets received characters, produces a signal such as a beep or vibration to notify the user of an incoming message, and displays multiple messages typically on a liquid crystal display (LCD). Other examples of microcontroller applications are use for controlling keyboards of personal computers, including to off-load many tasks formerly handled by the processor; in modems for command interpretation and data transmission; in printer buffers for storing and high speed dumping of data for driving the printer at low speed; in color plotters; color copiers; electronic typewriters; cable television terminal equipment; lawn sprinkling controls; credit card phone equipment; automotive applications such as engine control modules, anti-lock braking systems (ABS), and automobile suspension control for designating ride softness; to name some of the more popular applications.

In general, the microcontroller is battery-operated, with a microprocessor core that executes considerable internal instructions and performs numerous operations each second at its supplied clock rate. It is desirable to conserve power when the microprocessor is not being used, and typically this is done by suspending the operation of the microprocessor clock in what is commonly referred to as the "sleep" mode. The microprocessor may be exited or awakened, or "wake-up", from the sleep mode in response to the occurrence of one or more conditions. For example, the wake-up of the microprocessor may be in response to (I) an external reset signal being in a predetermined logic state; (ii) a watchdog timer, or any other timer, timing out; (iii) an interrupt signal occurring at an external pin; or (iv) a signal initiated manually by a user.

One technique for waking-up a microprocessor is disclosed in U.S. Pat. No. 5,315,549 to Scherpenberg et al which describes alternately enabling and disabling a sleep mode in response to an external logic signal. In particular, a memory controller for supplying backup battery power is disclosed having a sleep mode operation that is enabled when a logic signal is a logic low which turns off a field effect transistor and isolates the power output node. And when the logic signal is a logic high, the sleep mode is disabled because the field effect transistor is turned on and a battery node is connected to the power output node.

In U.S. Pat. No. 5,241,680 to Cole et al, a method and apparatus are disclosed for configuring a computer in a low-power mode, and in which the user can enter the full-power mode in a way that allows continuing with the application at the point just before entering the low-power mode. The latter mode is entered by saving an interrupt mask and by disabling interrupts, followed by saving the direct memory access (DMA) status, finishing DMA operations, and disabling DMA. After these steps, the I/O state of the machine is saved in various I/O registers and ports. A refresh of the memory is forced before the system refresh operations are discontinued.

In U.S. Pat. No. 5,117,500 to Davis et al, a battery powered receiver is disclosed including an adaptive signal decoder having means to conserve energy of the battery. The conservation means acts to disable a gated clock signal which disables most of the decoder if the bit rate search procedure fails to find an appropriate digital signal after several attempts. The decoder is implemented in CMOS logic elements, so that disabling the clock signal acts to reduce the power down by the decoder, to conserve the energy in the battery.

Neither these examples nor any other prior art of which the applicants are aware discuss waking-up a microprocessor from a sleep mode in response to an analog input signal exceeding a digitally programmable threshold level.

It is therefore a principal object of the present invention to provide a semiconductor device such as a microcontroller or microprocessor which is awakened from a sleep mode in response to an analog input signal which exceeds a digitally programmed threshold level.

SUMMARY OF THE INVENTION

In an exemplary embodiment, a microcontroller for battery charging and monitoring applications includes a microprocessor and front-end analog circuitry including, for example, a slope analog-to-digital (A/D) converter and a multiplexer by which each of a plurality of analog input signals may be converted to a digital count indicative of the respective analog signal level, to obtain a precise voltage measurement of the selected analog input.

To make the measurements of the selected analog inputs more precise, the microcontroller utilizes a calibration procedure in which selected parameters/voltages that are subject to change are measured during test for calculation of respective calibration constants therefrom. The calibration constants are formatted and stored in program memory for subsequent use by the microprocessor to calculate a more precise value for the respective analog input voltages.

The front end analog circuitry of the microcontroller also includes two charge rate controllers for controlling the charge/discharge rate of an external battery, each controller including a digitally programmable digital-to-analog converter (DAC) that provides a programmable voltage to a first input of a comparator whose second input is a voltage indicative of the current of the battery. The charge rate controller functions to substantially equalize the two inputs to the comparator by providing a control signal to an external transistor that controls the charging/discharging rate of the battery.

According to an embodiment of the present invention, each charge controller also functions as a level detector to detect when an input signal exceeds (or, alternatively, falls below) a digitally programmable threshold level. For example, the microprocessor may be placed in a sleep mode when the battery current being monitored is sufficiently low (and no external power source is being used) to indicate that no instructions or programs are being executed. The threshold level indicative of battery current when the microcontroller is fully operational is digitally set by programming the DAC output voltage to the first input of the comparator against which the second input of the comparator, in this example, the voltage indicative of battery current, is to be compared. When the charge rate controller functioning as a level detector detects that the analog signal constituting the actual voltage indicative of battery current has exceeded (or fallen below) the programmed threshold voltage, based on the comparison therebetween, the comparator-generated output signal is applied to "wake-up" the internal microprocessor from the sleep mode in readiness for executing instructions and/or programs.

In an alternative embodiment of the invention, the two level detectors may be programmed to detect opposite polarities, to operate as a window detector to deliver a wake-up signal to the microprocessor whenever the analog input signal exceeds a first threshold level or falls below a second threshold level. Such an arrangement allows both positive and negative battery current exceeding respective preset magnitudes to be detected and, in battery applications can serve to detect when the battery is placed in use to draw/discharge current, or is placed in a battery charger to receive a charging current.

In essence, the processor to put to sleep to save power, but needs to be awakened when the device is to be turned on, such as when a battery is to be charged, and this is done on an analog signal. The invention is not limited to battery management or fuel gauging, but rather, applies broadly to any situation in which it may be desired to wake up a semiconductor device in response to the presence of an intermittent or periodic analog signal having a predetermined characteristic such as a particular amplitude relative to a preset threshold level.

The signal of interest is not an interrupt or the like, although it may be used to trigger an interrupt, but an analog signal that initiates a wake up on change. The related characteristic, such as the threshold level against which the magnitude of the analog input signal is to be compared, is programmable to initiate the wake up of the device when that signal exceeds or drops below the threshold. Accordingly, the invention may be used in conjunction with sensor or security technology for automotive, home, commercial or industrial markets, to provide a wake-up call to the device on an analog signal or an RF signal having the predetermined characteristic(s). By way of example, the device may be attached to a garment or other article when placed for sale in a retail store and remain inert until awakened by encountering a magnetic signal at a door-front security gate.

BRIEF DESCRIPTION OF THE DRAWINGS

The above and still further aims, objectives, aspects, features and attendant advantages of the present invention will be better understood from a consideration of the following detailed description of a presently contemplated best mode of practicing the invention, taken in conjunction with the accompanying drawings in which:

FIG. 4 is a table illustrating address locations and data formats for calibration constants stored in the EPROM memory of FIG. 1;

FIG. 5 is a table illustrating a sampling interleaving sequence of analog input signals for A/D conversion;

FIG. 9 is a table illustrating a coarse-tuned current output of the DACs of FIG. 1 according to the upper 5 bits of log DAC registers;

FIG. 10 is a table illustrating the fine-tuned current output of the log DACs of FIG. 1 according to the lower 3 bits of log DAC registers;

FIG. 11 is a table illustrating the bits of a charge/level detect control (CHGCON) register;

DETAILED DESCRIPTION OF A PREFERRED EMBODIMENT AND METHOD

I. Overview of System of Exemplary Embodiment

Figure 1:
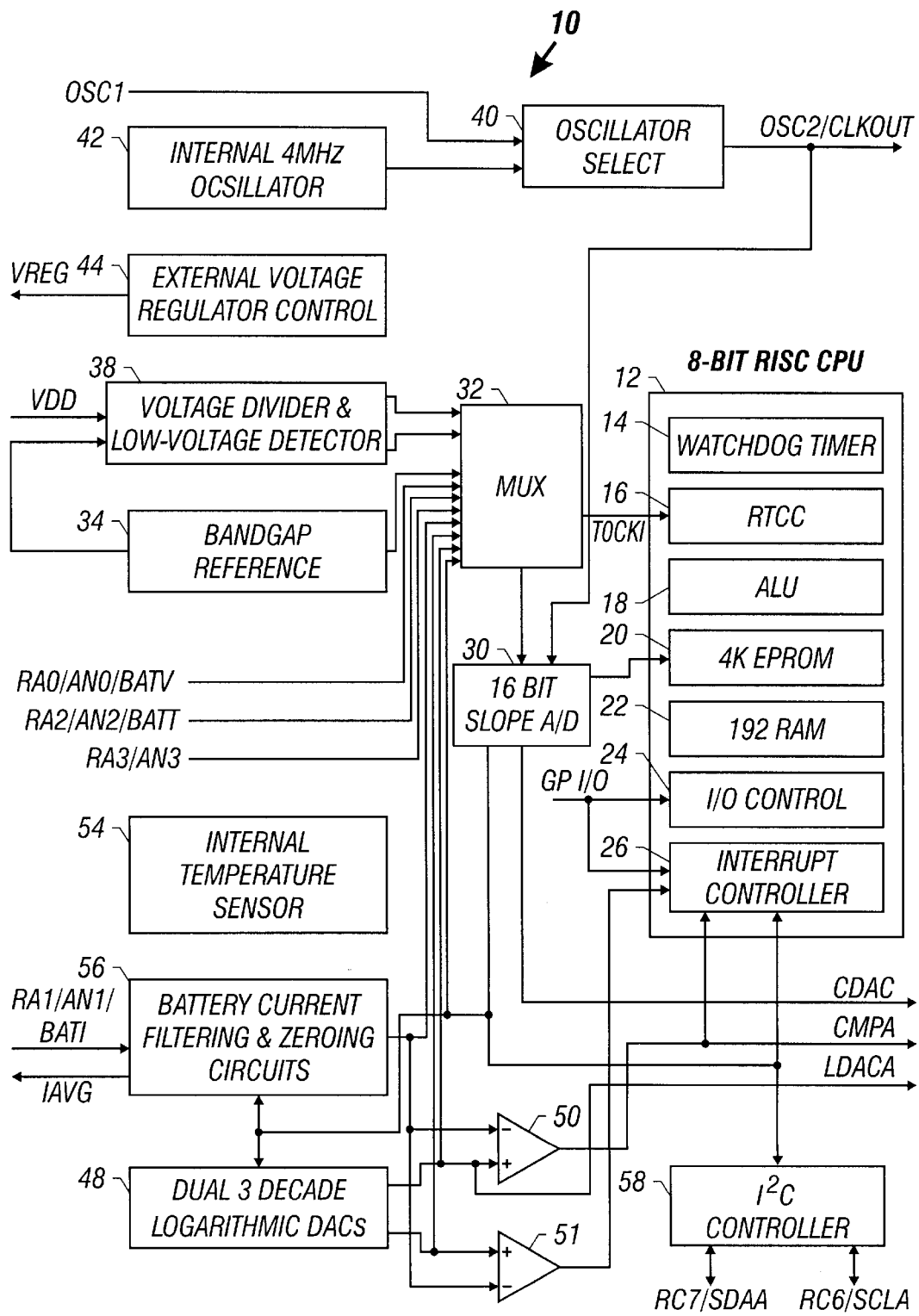
FIG. 1 is a detailed block diagram illustrating an system overview of a microcontroller device embodying the present invention.

FIG. 1 illustrates a detailed block diagram of a microcontroller integrated circuit chip 10 embodiment of the present invention. By way of example, the microcontroller chip may be a device marketed as the MTA140xx/Callisto™ programmable control integrated circuit by Microchip Technology Incorporated of Chandler, Ariz. for use in battery charging and battery monitoring applications ("Callisto" is a trademark of Microchip Technology Incorporated). The microcontroller device of this exemplary embodiment is designed for high-volume applications in portable computing, cellular phone, camcorders and other low-cost products where battery charging and monitoring control is desired. However, it will be understood that the present invention is not limited to such applications, but may be used in various other applications (such as to accurately measure analog input voltages), or to sense the presence of an analog signal having predetermined characteristics such as an amplitude that exceeds a programmed digital threshold value, as will be recognized from the detailed description of this specification.

Microcontroller chip 10 includes a microprocessor core 12 which may, for example, be a PIC® 16C6X/7X microcontroller core, also manufactured by Microchip Technology Incorporated (PIC is a trademark of Microchip Technology), an 8-bit reduced instruction set computer (RISC) CPU with Harvard architecture and separate instruction and data buses for 14-bit wide instruction word and separate 8-bit wide data word. A two-stage instruction pipeline allows all instructions (35 total) to be executed in a single cycle, except for program branches which require two cycles.

Figure 2:
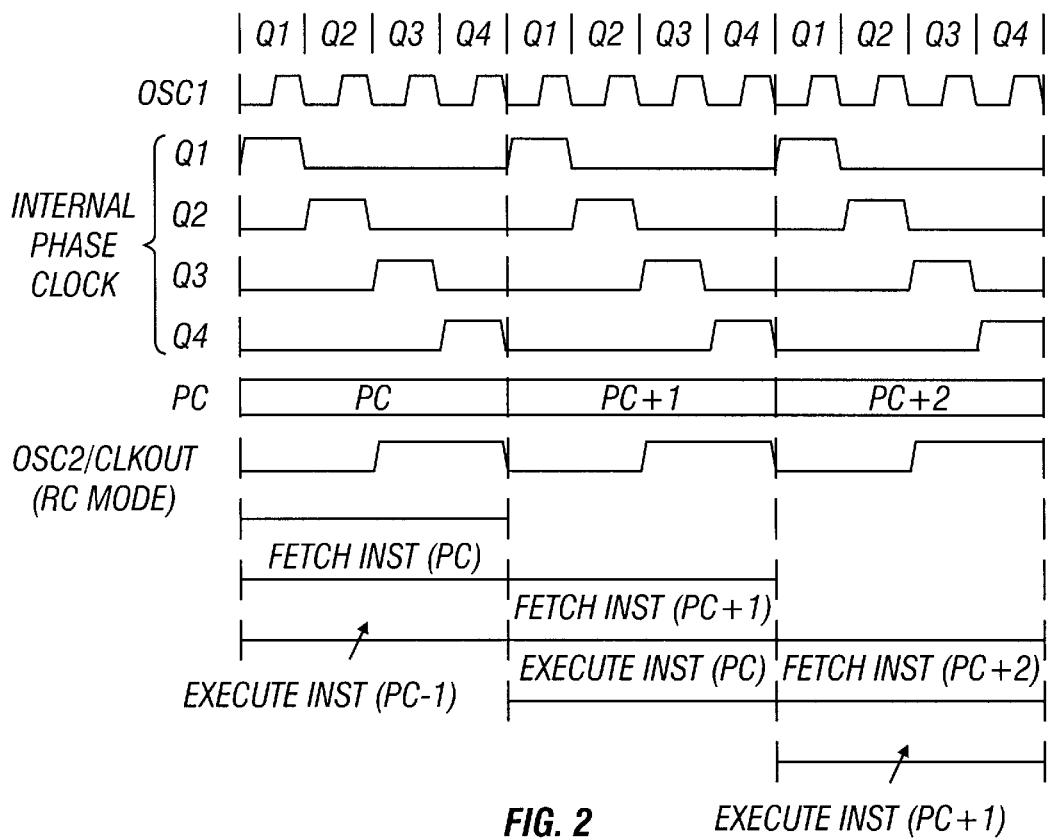
FIG. 2 is a graph illustrating the clock cycle of the microcontroller.

FIG. 2 illustrates a chart or graph of the clock cycle of the microprocessor core. The clock input, either from pin OSC1 or internal oscillator 42, is internally divided into four phases Q1, Q2, Q3 and Q4 which generate a full processor clock cycle. Two clock cycles would normally be required to complete any instruction, an instruction being fetched during one clock cycle and executed during the next clock cycle. However, because of use of a two-stage pipeline, the execution of one instruction cycle overlaps the fetching of the next instruction cycle, thereby effectively reducing the cycle time to one clock cycle per instruction. But if an instruction causes the program counter to change, such as a GOTO instruction, then two cycles are required to complete the instruction. Briefly, a fetch begins with the program counter (PC) incrementing during the Q1 portion of the clock cycle. The fetch instruction is latched into the instruction register which is decoded and executed during the Q2–Q4 portions of the clock cycle.

Microprocessor core 12 includes a watchdog timer 14 constituting a free running on-chip RC oscillator with no external components. Preferably, the watchdog timer has a nominal time-out period of 18 milliseconds, but if longer time-out periods are desired, a prescaler with a division ratio of up to 1:128 can be used under software control to selectively increase the time-out period up to 2.3 seconds.

Microprocessor core 12 also includes a real-time clock/counter (RTCC) 16 and an arithmetic logic unit (ALU) 18 for performing calculations an erasable programmable read-only memory (EPROM) 20 with 64 words of calibration memory space for storing various calibration constants (described in greater detail below), a random access memory (RAM) 22 for temporary storage, an input/output (I/O) control 24 for general purpose I/O, and an interrupt controller 26 for receiving and responding to interrupts.

Several analog peripherals form an analog front-end for the microprocessor, to provide signal conditioning and analog-to-digital functions for various applications, such as battery charging and monitoring control for example. All analog functions are directly controlled by the microprocessor core, to maximize flexibility and to allow for customizing via firmware. The front-end analog peripherals include a slope A/D converter 30 and a multiplexer (mux) 32 for converting a plurality of external analog signal inputs to digital counts indicative of the respective analog input signal level. Slope A/D converter 30 is a medium-speed, high-precision converter, ideal for monitoring DC and low frequency AC signals.

Also included in the analog front-end circuitry is a bandgap reference 34 which eliminates the need for an external reference voltage source and provides a voltage to voltage divider block 38 to generate precise high and low slope reference voltages for slope A/D converter 30. In the exemplary embodiment, the high slope reference voltage is typically 1.23 volts, for the slope detect upper limit in the A/D conversion, while the low slope reference voltage is typically approximately ⅑ of the high slope reference voltage or about 0.14 volts. The bandgap reference also supplies a voltage to low voltage detector 38 for detecting the presence of a low voltage condition.

An oscillator select block 40 offers selection between an external oscillatory signal (OSC1) or an internal 4 MHZ oscillatory signal provided by internal oscillator 42 to provide a clock signal to slope AD converter 30 as well as an output clock signal (CLKOUT).

Microcontroller 10 also includes on-chip voltage regulator control 44 to provide regulated voltage VREG, selectable for 3 or 5 volt operation, and eliminate the need for external voltage regulators.

Two, 3-decade, 8-bit digital-to-analog converters (DACs) 48 are combined with two comparators, 50 and 51, to form two charge control channels. The dual DACs and comparators can alternatively be configured to function as level detectors, either as a single window detector or two separate level detectors. Furthermore, these level detectors can be used to generate interrupts to the microprocessor core to provide wake-up or limit detect functions.

An on-chip temperature sensor 54 provides internal temperature monitoring, as needed. Filtering and zeroing circuits 56 provide a "zeroing" technique to increase the accuracy of low value, analog input measurements, such as measurement of low battery current, by simulating a zero current condition.

An inter-integrated circuit ($I^2C$, which is a trademark of Philips Corporation) interface controller 58 allows microcontroller 10 to communicate with other $I^2C$ compatible devices via its serial data pin (SDAA) and serial clock pin (SCLA), and may also be used to program microcontroller 10 while in an end-use application.

II. Slope A/D Converter

Figure 3:
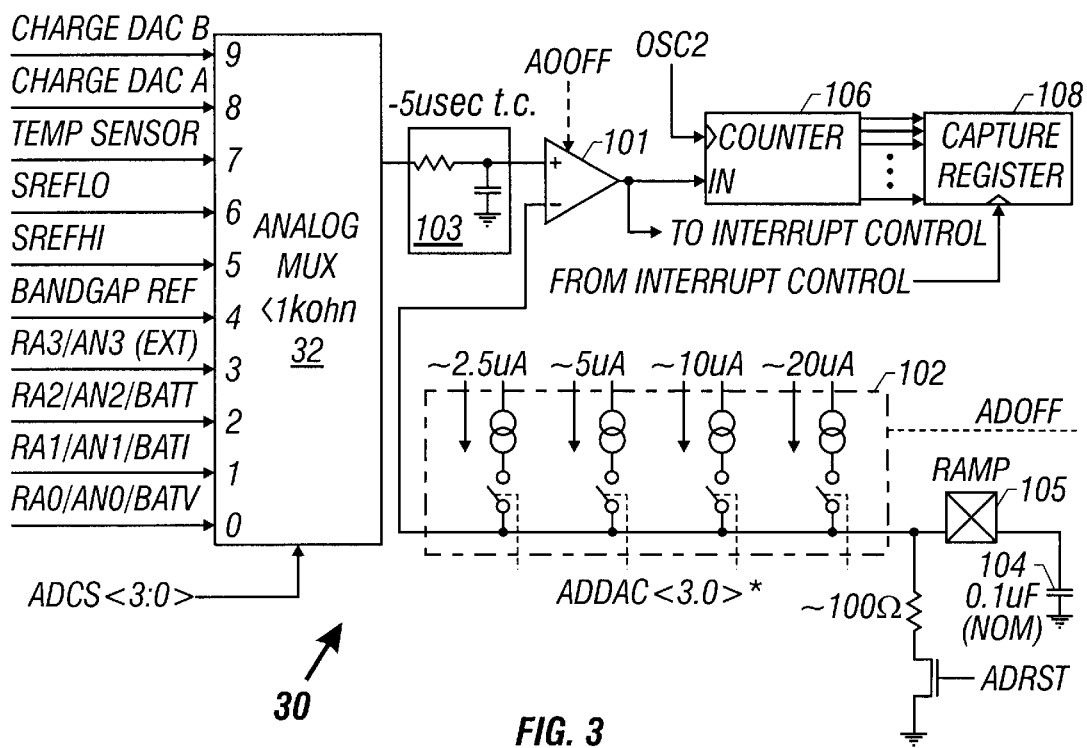
FIG. 3 is a detailed schematic/block diagram of a slope analog-to-digital converter which may be used in the embodiment of FIG. 1.

A more detailed schematic/block diagram of slope A/D converter 30 is shown in FIG. 3. The slope A/D converter is the heart of the analog front-end circuitry, used to translate a selected one of a plurality of analog signals, appearing at the inputs of mux 32, into respective digital count values as a digital measurement of the selected analog input voltage. For example, the analog inputs may include signals representing a battery voltage (BATV), a battery current (BATI), a battery temperature (BATT), an external analog voltage (RA3/AN3), the bandgap reference voltage of block 34, high and low slope reference voltages (SREFHI, SREFLO) of voltage divider block 38, an internal temperature voltage of sensor 54, and two DAC outputs (Charge DAC A and Charge DAC B) of dual DAC block 48.

The slope A/D converter includes a precision comparator 101 having a non-inverting input coupled to receive the selected one of the plurality of analog input signals, and an inverting input coupled to an external pin 105 (the RAMP pin) to which an external capacitor 104 is coupled for generating a ramp voltage thereacross. An RC low pass filter 103 coupled between the output of analog mux 32 and a non-inverting terminal of comparator 101 has a typical time constant of 5 microseconds ($\mu$secs).

A 4-bit programmable slope control DAC 102 includes a plurality of switchable current sources for selectively controlling the charge current to external capacitor 104 to lie in a range from 0 to 37.5 microamps (μA), for example, in steps of 2.5 μA via 4-bit digital control signal ADDAC. The external capacitor may have a value of, for example, 0.1 microfarad (μF), and should have a low voltage coefficient for optimum results. A transistor 109 is coupled to DAC 102 for disabling all current sources if signal ADRST is a logic "1". The output of comparator 101 is supplied to an input of a counter/capture timer 106, the output of which is supplied to the input of a capture register 108.

In operation of the slope A/D converter, each of the plurality of analog signals on the analog input channels is independently selected by mux 32 for conversion to a digital count representative of the respective analog voltage level. Each conversion takes place by first resetting counter 106 and register 108 while simultaneously discharging external capacitor 104 to ground for a predetermined minimum time of, for example, 200 μsecs. Reset is then released and counter 106 begins counting at the same time capacitor 104 begins to charge based upon the charging current supplied by DAC 102. Capacitor 104 need not be discharged exactly to zero volts before charging begins again, because of the capability of microcontroller 10 to cancel the effects of an indeterminate, non-zero capacitor voltage that may result at reset. Similarly, it is not critical that the counter begins counting at exactly the same time that capacitor 104 begins charging.

When the voltage across capacitor 104 exceeds the voltage of the selected analog input signal, comparator 101 switches from a logic high to a logic low. This transition initiates an interrupt to microprocessor core 12 and an interrupt control signal causes a capture event to occur by latching (capturing) the count of counter 106 into capture register 108. The count stored in register 108 represents the elapsed time for capacitor 104 to reach a charge level just barely exceeding the level of the selected analog input voltage and corresponds to a measurement thereof the selected analog input. A more precise voltage measurement of each selected analog input signal is obtained using unique calibration procedures and filter algorithms.

III. Calibration Procedure

Generally, a minimum set of parameters are to be adjusted or "trimmed" during testing from which calibration constants are calculated and stored in EPROM 20 space for subsequent retrieval to increase the accuracy of the A/D measurements. The minimum set of parameters that require trimming in the exemplary embodiment include the ratio of lower slope reference voltage to upper slope reference voltage, the bandgap voltage, the internal temperature sensor (thermistor) voltage, and selected oscillator frequencies.

A. A/D Slope Reference Calibration Constant (Kref)

The on-chip slope A/D converter 30 requires a known ratio between two voltage points in order to determine the coefficients of a linear transfer function. Slope reference generator 36 (FIG. 1) generates an upper slope voltage and a lower slope voltage a bandgap voltage supplied from bandgap reference circuit 34 and the ratio of the lower slope reference voltage to the upper slope reference voltage is calculated from their respective measured values. The A/D slope reference calibration constant Kref is calculated as follows. Mux 32 selects the upper slope reference voltage (SREFHI), one of the voltages supplied by slope reference generator 36, and its value is measured in the previously described manner using precision voltage measurement circuitry coupled to the output of mux 32, which may be located on a separate test load board. Mux 32 is then switched to select the lower slope reference voltage (SREFLO), the other output of slope reference generator 36, and its value is measured in similar manner. Then, the calibration constant Kref is calculated as being equal to the ratio of SREFLO/(SREFHI-SREFLO).

B. Bandgap Reference Voltage Calibration Constant (Kbg)

In the exemplary embodiment, the bandgap voltage provided by bandgap reference circuit 34 is approximately 1.23 volts, but since this voltage exhibits a slight dependency on supply voltage (less than 1 millivolt) and temperature (typically less than 10 millivolts) the actual voltage supplied by the bandgap reference circuit is measured and its value stored in EPROM 20. This measurement is made by selecting the output voltage of bandgap reference circuit 34 with mux 32 and then using the precision voltage measurement circuitry at the output of the mux, to obtain the bandgap reference voltage calibration constant Kbg.

C. Thermistor Calibration Constant (Kthrm)

Although the temperature coefficient of internal temperature sensor/thermistor 54 is relatively constant over temperature, the absolute magnitude of the voltage output can vary significantly with process. Therefore, the absolute magnitude of the output voltage of thermistor 54 is measured at a predetermined temperature and the measurement is stored in the calibration EPROM. The same measurement procedure is used as that for the bandgap voltage except that mux 32 is programmed to select the output of thermistor 54.

D. Temperature Coefficient Calibration Constant (Ktc)

The dependency of the temperature coefficient of the thermistor on process is extrapolated by first measuring the thermistor voltage at the output of mux 32 and then adjusting the temperature coefficient calibration constant Ktc based upon this measured voltage value. The temperature coefficient calibration constant is obtained from characterization data of the thermistor output voltage with respect to various temperatures and the correlation between thermistor output voltage and its slope. The temperature coefficient of the thermistor is compensated based upon the output voltage at a given temperature, to improve accuracy of the analog signal measurements.

E. Internal Oscillator Calibration Constant (Kin)

Calibration for the frequency of the internal clock to compensate for process variation includes measuring Fosc, the frequency of the internal clock at the external OSC2/CLKOUT pin, and then calculating the calibration factor Kin as the integer function of [(measured frequency—3.00 MHz)/10 Khz], which assumes that the measured frequency is greater than 3.0 MHZ.

F. Watchdog Timer Calibration Constant (Kwdt)

Calibration for the frequency of the watchdog timer 14 to compensate for process variation includes calculating a calibration factor Kwdt from the operating frequency of the timer as measured by monitoring the logic state of a predetermined bit in a status register indicative of the logic level of the watchdog timer signal. The calibration factor Kwdt is equal to the integer function of [(measured frequency/1 Hz].

Each of these calibration constants/factors is formatted and programmed into EPROM memory 20 at the address locations and data formats shown in FIG. 4.

IV. A/D Conversions Using Stored Calibration Constants

Conversion of A/D count values obtained by A/D converter 30 to a corresponding input voltage value is performed by the microprocessor core 12 according to EQN. 1.

$$Vin = \frac{(Cin - Coffset)}{(Cbg - Coffset)} \times Kbg \qquad \text{EQN. 1}$$

where:

Coffset=Creflo−Kref(Crefhi−Creflo);

Vin=Resulting (digital) absolute voltage value of selected input;

Cin=A/D count value for selected input;

Creflo=A/D count value A/D lower reference point;

Crefhi=A/D count value for A/D upper reference point; and

Cbg=A/D count value for bandgap reference.

The offset term (Coffset) compensates for turn-on delays or voltage offsets that may occur in starting the voltage ramp of the slope A/D converter. For example, if the ramp counter starts counting before the ramp voltage begins increasing, or if the ramp voltage does not start from exactly 0 volts, an offset count will occur with every conversion. Accordingly, the offset term is the count value of the turn-on delay or offset voltage.

When performing A/D conversions for the various analog inputs, the analog inputs to be converted are selected on an interleaved basis to maximize the sampling rate for high priority signals that may undergo more frequent variation, such as battery current, and to reduce the sampling rate for low priority signals that change at relatively slow rates, such as temperature inputs. FIG. 5 illustrates the interleaving priority scheme for sampling the various analog input signals. Battery current is assigned the highest priority and sampled 8 times per 16 A/D cycles; battery voltage the next priority, sampled 2 times per 16 A/D cycles; and battery temperature (from external thermistor input and internal temperature) is sampled once during 16 A/D cycles, as are current network zero voltage, bandgap voltage, and A/D lower and upper reference voltages.

Figure 6:
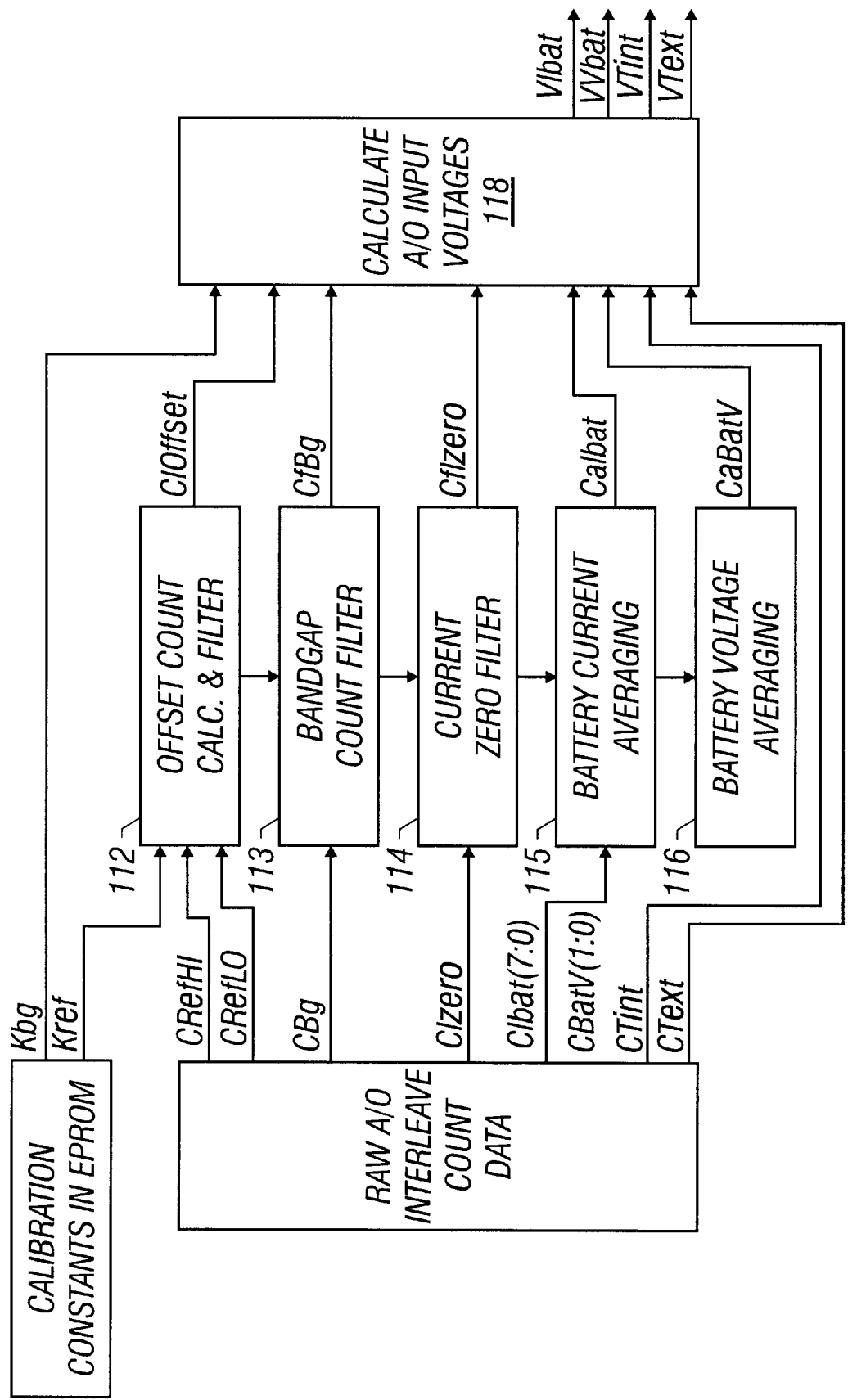
FIG. 6 is a flow diagram illustrating the A/D data flow.

To stabilize the reference value and further enhance A/D accuracy, the raw count data of certain analog inputs obtained from the A/D converter are filtered prior to calculating the actual voltage values for the A/D analog inputs. FIG. 6 is a flow diagram illustrating the A/D data flow including filter algorithms 112–114 and average algorithms 115–116 for use in calculating actual voltage values from the A/D count values. The count value for the bandgap voltage (Cbg) is filtered by calculating the rolling average of the last 16 count values obtained. The filtered value of the bandgap count (Cfbg) is calculated as:

$$C_f bg_i = \frac{(Cbg_i + (15 \times Cbg_{i-1}))}{16} \qquad \text{EQN. 2}$$

where the subscript i denotes the interleave sequence number.

This filtered value of the bandgap count is then supplied to microprocessor core 12 and is used to calculate the voltages at the output of block 118, described below.

The count offset value (Coffset) is filtered as CfOffset by calculating the rolling average of the last 16 count values obtained as:

$$CfOffset = \frac{(Coffset_i + (15 \times Coffset_{i-1}))}{16} \qquad \text{EQN. 3}$$

where

Coffset$_i$=Creflo$_i$−Kref(Crefhi$_i$−Creflo$_i$)

CfOffset is then supplied to microprocessor core 12 for use in calculating the A/D input voltages.

The current input zero offset count (CIzero) is filtered as CfIzero by calculating the rolling average of the last 16 count values obtained as:

$$CfIzero = \frac{(CIzero_i + (15 \times CIzero_{i-1}))}{16} \qquad \text{EQN. 4}$$

CfIzero is also supplied to microprocessor core 12 to calculate the input voltages.

Raw count data obtained from the battery voltage and battery current channels is also filtered/averaged. The battery current count value (CIbat) is filtered by taking an average of the 8 samples of the input channel from the interleave sequence as:

$$CfIbat = (1/8) \sum_{s=0}^{7} (CIbat_s) \qquad \text{EQN. 5}$$

The filtered battery current count value (CfIbat) reduces the quantity of data needed to be supplied to the digital integrators that track battery capacity.

Similarly, the count value for the battery voltage (CBatV) is filtered by calculating the average of the two samples of the input channel from the interleave sequence as:

$$CfVbat = (1/2) \sum_{s=0}^{1} (CVbat_s) \qquad \text{EQN. 6}$$

The filtered count values together with the calibration constants stored in EPROM 20 are used to calculate more precise digital values of the input voltages for battery current and battery voltage as:

$$VIbat = \frac{(CfIbat - CfIzero - CfOffset)}{(CfBg - CfOffset)} \times Kbg \qquad \text{EQN. 7}$$

$$VVbat = \frac{(CfVbat - CfOffset)}{(CfBg - CfOffset)} \times Kbg \qquad \text{EQN. 8}$$

More precise digital values for the internal and external temperature voltages are calculated as:

$$VTint = \frac{(CTint - CfOffset)}{(CfBg - CfOffset)} \times Kbg \qquad \text{EQN. 9}$$

$$VText = \frac{(CText - CfOffset)}{(CfBg - CfOffset)} \times Kbg \qquad \text{EQN. 10}$$

Thus, by measuring and storing various calibration constants and various filtering algorithms in memory and performing certain calculations therewith, very precise measurements of the selected analog input signals are obtained.

V. Zeroing Circuit

Figure 7:
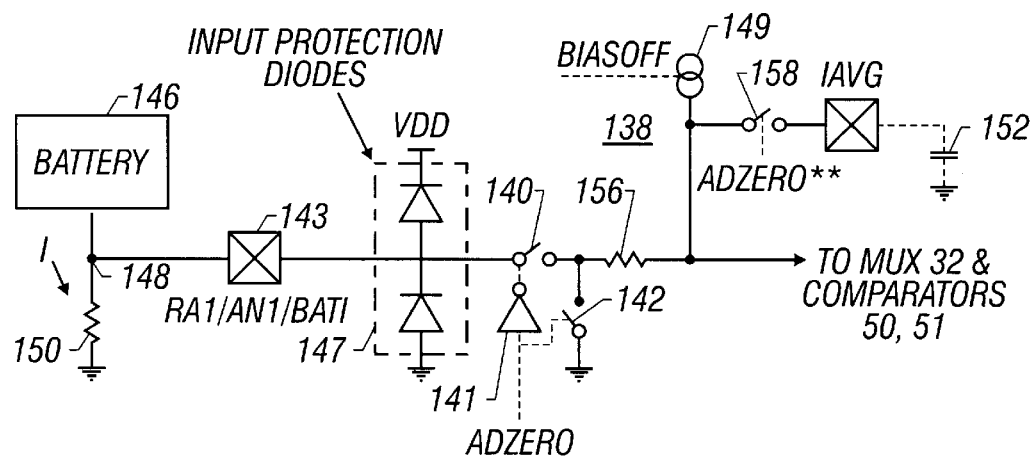
FIG. 7 is a detailed schematic/block diagram of a zeroing circuit which may be used in the embodiment of FIG. 1.

For accuracy in measuring low level analog signals, it is important to know exactly where the zero reference point lies. Referring to FIG. 7, zeroing circuit 138 of block 56 (FIG. 1) implements a zeroing technique. The zeroing circuit includes two matched pass gates 140 and 142 for simulating a zero current condition. If switches (e.g., field-effect transistors) 140 and 142 are not precisely matched, the mismatch may be measured and stored as an additional calibration constant in EPROM 20 for use in improving A/D accuracy. Switch 142 is responsive to microprocessor core 12 signal ADZERO while switch 140 is responsive to the inversion thereof via inverter 141. Also included in zeroing circuit 138 are input protection circuit 147 and switchable current bias source 149.

In operation, when switch 140 is open and switch 142 is closed, the voltage corresponding to a zero current condition is supplied to mux 32 (and comparator 50 or 51), which simulates the zero current condition occurring at pin 143, i.e., enables the slope A/D converter to obtain a digital count corresponding to a zero current at that pin. Therefore, when switch 140 is closed and switch 142 is open, subsequent digital counts corresponding to subsequent analog current measurements at pin 143 are computed relative to this zero count.

For capturing even smaller current pulses, an optional filter capacitor 152 may be coupled to current averaging pin (IAVG) 154 and ground. Capacitor 152 and internal resistor 156 form an RC network to act as a DC averaging filter, and capacitor 152 can be adjusted to obtain a desired time constant. Switch 158 is coupled between zeroing circuit 138 and IAVG pin 154 and is closed during A/D sampling periods and automatically opened during the zeroing operation via the inversion of signal ADZERO.

In a battery monitoring application, zeroing circuit 138 is used to increase the accuracy of the measurement of current supplied by battery 146 at pin 143 by connecting an external sense resistor (150) in series with the battery. The output of battery 146 is coupled to circuit node 148 which is coupled to pin 143 and returned to ground through sense resistor 150, typically a low value resistor of say 0.05 ohms. Accordingly, low voltages are typically generated across resistor 150; e.g., for a +/−5-amp battery pack and a 0.05 ohm sense resistor, a voltage range of −0.25 to +0.25 volts (the polarity being a function of whether the battery is being charged or is supplying an output current) appears at pin 143.

VI. Charge Control/Current Flow Detectors

As discussed above, microcontroller 10 has a pair of DACs which, together with individual comparators, may provide two charge rate control channels, or, alternatively, may be configured to function as level detectors, either as two separate level detectors or as a single window detector.

Figure 8:
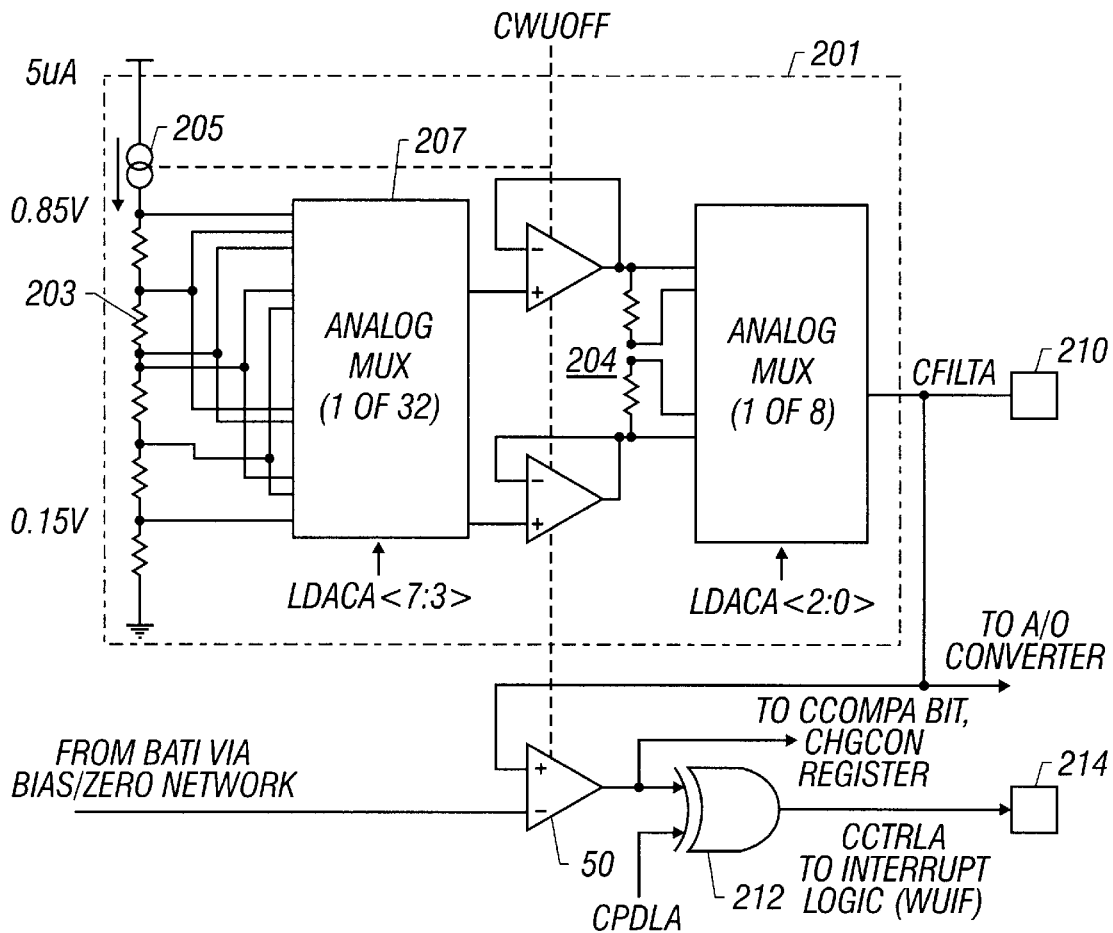
FIG. 8 is a detailed block diagram illustrating a first charge controller/level detector of the microcontroller.

FIG. 8 is a detailed block diagram illustrating one of the dual DACs (201) used in conjunction with one of the comparators (50) as a first charge control channel (Channel A). Briefly, DAC 201 supplies a programmable voltage at its output (the output of mux 208) and to the non-inverting input of comparator 50. The other (inverting) input of comparator 50 is coupled to receive a voltage from zeroing circuit 56 indicative of a sensed current, from an external battery for example. When operating in a charge control mode, the output of comparator 50 is coupled through XOR gate 212 and supplies a charge control signal at external pin 214 which would be coupled to an external field-effect transistor (FET) for controlling the battery charge current. In the charge control mode, the charge control circuit of FIG. 8 provides feedback to make the voltage (corresponding to the sensed current) substantially equal to the output voltage of DAC 201 and effectively controls the extent of charging of the battery.

When the circuit functions as a level detector, such as when used as a battery voltage or current monitor, it detects a condition in which the analog input voltage programmably selected by mux 32 to be measured (corresponding, in this embodiment and specific example, to the battery sense current) has either fallen below or risen above (depending on programming or circuit implementation) a preset threshold voltage. This preset threshold voltage is the programmed output voltage of the DAC in the respective channel (e.g., DAC 201) which is applied to the respective comparator for that channel (e.g., comparator 50). Upon detecting such a condition or occurrence, comparator 50 undergoes a change of state which may be used to initiate any of various events that perform a control function; for example, to wake-up the microprocessor from a sleep/idle mode. In the latter example, the change of state of the comparator is used to trigger an interrupt to microprocessor core 12 by setting a wake-up interrupt flag (WUIF) and awaken the microprocessor from a sleep/idle mode in which one or more of its functions (or related operations) had been suppressed for the purpose of conserving power during a time when the microprocessor (or a related operation) was not being called upon to perform functions. This activity is described more fully below.

DAC 201 includes two resistor ladders, 203 and 204, current source 205 and analog multiplexers 207 and 208. Resistor ladder 203 provides a course adjustment of the output voltage, while resistor ladder 204 provides fine tuning of the output voltage of the first ladder. The course resistor ladder 203 is matched to the current sensed bias resistor so that the center point of the ladder is approximately equal to zero current flow. Accordingly, this allows DAC 201 to control or monitor both charge and discharge current flow, i.e., both positive and negative current flow.

Resistor ladder 203 has 32 taps and is divided into 2 decades/regions. The first decade controls trickle or topping charge rates, with a resolution of 5 millivolts (mv) and a range of +/−50 mv, which corresponds to a current resolution of 100 milliamps (mA) and a range of +/−1 amp with the use of an external 0.05 ohm sense resistor. The second decade is for fast charge applications, with a resolution of 50 mv and a maximum range of +/−0.35 volts, which corresponds to a current resolution of 1 amp and a range of +/−7 amps with an external 0.05 ohm sense resistor. The fine tune resistor ladder 204 has 8 taps and is used to divide the buffered output voltage from the course ladder. This yields an overall minimum DAC voltage resolution of approximately 0.714 mv or a current resolution of about 14.3 mA with a 0.05 ohm sense resistor.

The voltage granularity and range of DAC 201 depends on the value of the logic bits stored in a DAC A data register (LDACA). LDACA register controls the output voltage of DAC 201, the upper five bits (bits 3–7) of the register controlling mux 207 for selecting an voltage output range for course ladder 203 according to the table of FIG. 9. That Figure also indicates a corresponding sense current range using a 0.05 ohm resistor, the current ranges shown in ( ) in the bottom half of the table denoting negative current corresponding to charging of a battery. Further, the three lower bits (bits 0–2) of the LDACA register control mux 208 for selecting the fine tune adjustment for ladder 204 according to the table of FIG. 10.

As an example, if a positive/discharge current of 340 milliamps is desired, the LDACA register would be set to a binary value of "00011010". The upper 5 bits ("00011") yield a coarse range of 300–400 mA (FIG. 9), while the lower 3 bits ("010") select the fine tune setting of ⅜ times the course range maximum (FIG. 10), or approximately 37.5 mA. If a negative/charge current of 340 mA were desired, then LDACA register would be set to the binary value of "10011010".

The output of analog mux 208, which is the analog voltage output from DAC 201, is supplied as one of the plurality of inputs of A/D converter 30 and may be connected to an external filter capacitor via external pin 210. The output of mux 208 is also coupled to the non-inverting input of comparator 50 whose inverting input is coupled to receive a voltage corresponding to a sensed current of an external battery (BATI) after passing through zeroing circuit 56.

The output of comparator 50 is coupled to a first input of XOR gate 212 whose second input is coupled to receive charge control polarity bit CPOLA for inverting the output of comparator 50 when set to a logic "1". Accordingly, XOR gate 212 may be programmed to cause an interrupt or to trigger another event if the sense voltage is above (or below) the DAC voltage from the CPOL bit in the CHGCON register. The output of XOR gate 212 provides the charge control signal (CCTRLA) to an external power FET or bipolar power transistor via pin 214 for controlling the charge current to the external battery.

To enable the charge control mode, a charge control function enable bit (CCAEN) of a charge/level detect control (CHGCON) register is set to a logic "1"; otherwise, pins 210 and 214 will assume their normal port I/O functions. FIG. 11 illustrates the bits of the CHGCON register. If bit CCAEN is a logic "1", the charge control circuit functions to equalize the current sense voltage appearing at the inverting terminal of comparator 50 with the programmable DAC output voltage appearing at the non-inverting input of the comparator, thereby effectively controlling the amount of charging current to the battery. The status of the charge control comparator bit (CCOMPA) as well as the charge control polarity bit A (CPOLA) is also readable from the CHGCON register. The CHGCON register also includes the corresponding comparator and polarity bits (CCOMPB and CPOLB) associated with channel B.

Figure 12:
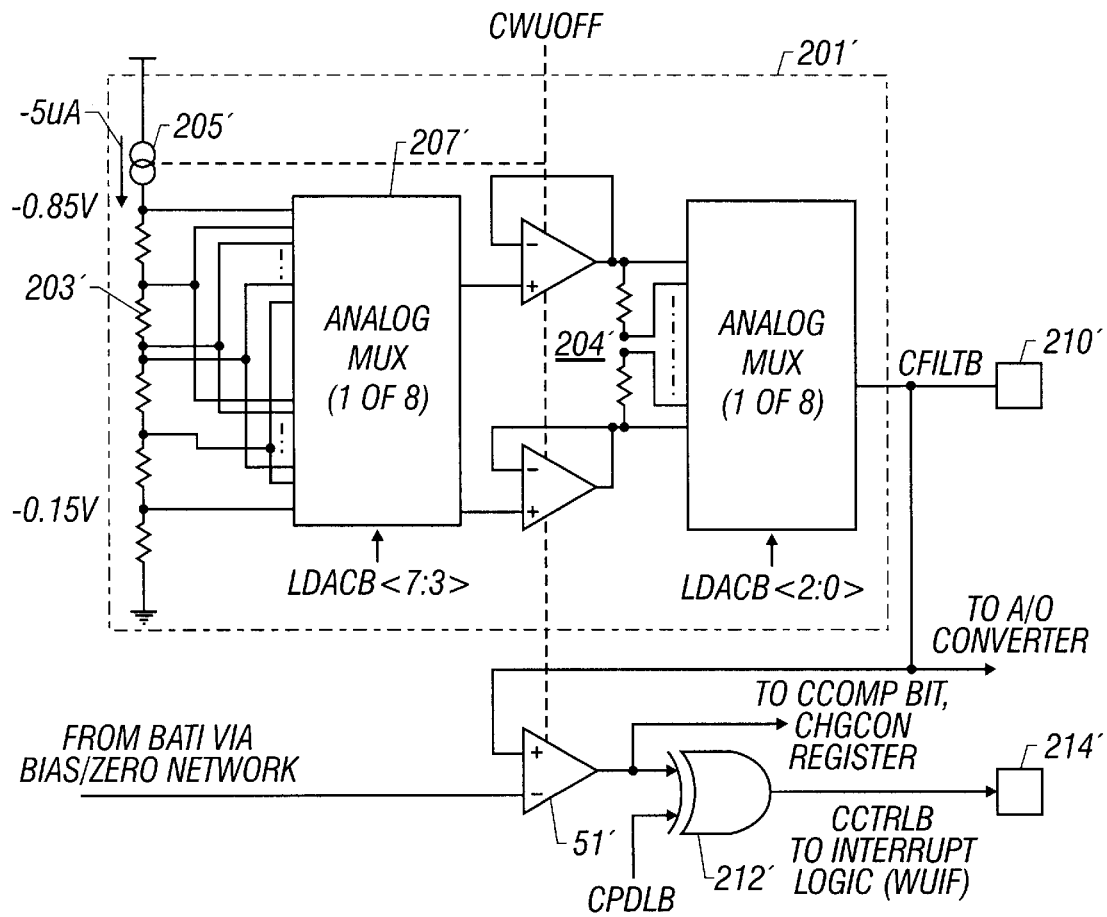
FIG. 12 is a detailed block diagram illustrating a second charge controller/level detector.

FIG. 12 illustrates the second charge control/level detector channel (Channel B) using a second DAC 201' of block 48 in conjunction with comparator 51. Charge control Channel B is very similar to charge control Channel A of FIG. 8, components of FIG. 12 that are identical to those in FIG. 8 being identified by prime (') reference numbers. The inputs of comparator 51 of channel B, however, are reversed with respect to comparator 50 of FIG. 8, the inverting input of comparator 51 being coupled to the output of DAC 201 and the non-inverting input of comparator 51 being coupled to receive the voltage corresponding to sensed battery current (BATI) via the zeroing circuit. Also, the voltage supplied at the output of DAC 201 is controlled by the 8-bits of a DAC B (LDACB) register in a manner similar to that in which the LDACA register controls the current at the output of DAC 201 and according to the tables of FIGS. 9 and 10.

According to an important aspect of the present invention, the dual charge controller/level detectors are alternatively used to detect when an input signal exceeds or falls below a programmable threshold level. The level detectors may be used even though charge control is not being performed. In such a case, the charge control enable bit (CCAEN) of the CHGCON register would remain at a logic "0". Referring back to channel A of FIG. 8, the programmable threshold level is digitally set by programming the desired voltage output for DAC 201 via the LDACA register. In this way, a programmed threshold voltage is applied to the non-inverting input of comparator 50 such that when the signal appearing at the inverting input of the comparator exceeds this programmed threshold voltage, comparator 50 switches logic states. This logic change may be used to initiate a predetermined event or function of the device, such as to set a flag and cause an interrupt to microprocessor core 12, thereby calling for immediate action to be taken. The logic state of the output of comparator 50 may be monitored by reading the CHGCON register (bit 2), as discussed above.

VII. Wake-Up Function With Digitally Programmable Threshold

Microcontroller 10 is provided with a sleep mode that is entered by the execution of a specific sleep instruction. Preferably, in the sleep mode the on-chip oscillators are turned off but the watchdog timer continues to run. The microcontroller may also have a hibernate mode, for example, identical to the sleep mode except that the watchdog timer is turned off. These modes enable considerably lowered power consumption as the oscillators or other portions or functions of the microprocessor are disabled (turned off) because the microprocessor or applicable portion is not performing or being asked to perform a function at the particular time, usually after a specified delay interval of non-performance has elapsed.

Microcontroller 10 will exit or "wake-up" from the sleep mode (or hibernate mode) in response to the occurrence of any one of several events, such as an external reset input, the timing out of the watchdog timer (if enabled), the detection of a start/stop bit at the I$^2$C serial lines, or when an A/D conversion is complete, for example. By way of further example of the specific embodiment being described herein, with microcontroller 10 used in a battery monitoring and charging application, the level detectors may be used to detect when a sensed battery current exceeds (or falls below) a programmed threshold level to initiate a waking up of microprocessor core 12. It will be recognized that the processor is put to sleep (or otherwise idled, as in the hibernate mode) to save power, but needs to be awakened whenever the device is called upon to perform a function, such as a control function calling for an associated battery to be charged. Moreover, it is noteworthy that this "wake-up" of the device or a function thereof is performed in response to an analog signal. In that respect, the invention is not limited to battery management or "fuel gauging," but may be used in any application where there is a need or a desire to wake up a piece of silicon on an intermittent or a periodic analog signal.

The signal itself that initiates this action is not an interrupt, but is analogous to a wake up on change, which is a digital signal—but the occurrence on which it is based is an analog signal. Theoretically, a programmer is required to condition the "wake-up" to occur on the presence of an analog signal relative to a predetermined level or certain predetermined levels. By way of further example, the invention is applicable to sensor technology for the automotive market, the home market, the security market, or for any other application that calls for a wake-up on an analog signal or an RF signal, such as where the microelectronic chip is fastened to a garment or other article and is activated to wake up and initiate an audible or other signal or alarm upon passage by an analog or RF signal emitter at, say, the entrance/exit to a retail store or other operation having a desired secure point of access or ingress/egress. In the specific example of a battery management or fuel gauging system with which the embodiment described herein is used, as well as in the specific applications to which such an embodiment may be used for control, monitoring or other related purposes, and in various emerging sensor and security markets, the devices employed are battery operated. Hence, the present invention is applicable in both respects, viz., to monitor and control the battery output as well as to initiate an action in response to the occurrence of an analog signal of predetermined characteristics (i.e., that exceeds or falls below a selected target level).

With reference again to FIG. 8, when the sensed voltage, which is a voltage representing the sensed current of a battery (BATI), exceeds the programmable threshold voltage set by DAC 201, comparator 50 switches from a logic high to a logic low, thereby setting a wake-up interrupt flag (WUIF) and causing an interrupt to microprocessor core 12. Accordingly, the microprocessor core can be immediately brought out of the sleep mode and the increased current output from the battery can be adequately monitored for true, accurate and timely gauging of the battery (fuel) level.

In a similar manner, the level detector of channel B (FIG. 12) can be used as an independent level detector to detect when another analog input signal exceeds or falls below a digitally programmable threshold level. For example, when the voltage from the zeroing circuit exceeds the programmable threshold voltage set by DAC 201, comparator 51 switches from a logic low to a logic high, thereby setting a wake-up interrupt flag (WUIF) and causing an interrupt to microprocessor core 12.

Alternatively, by programming the two DACs to detect opposite polarities, a window detector may be implemented wherein, for example, both positive battery current flow exceeding a programmed threshold and negative battery current flow falling below a programmed threshold can cause an interrupt to the microprocessor core; and logic bits CCOMPA and CCOMPB representing the outputs of comparators 50 and 51, respectively, may be read to determine which of the two detectors caused the interrupt. Such a window detector is especially useful in battery applications for detecting when a battery not currently in use is subsequently placed in use in a device, such as a camcorder, that draws/discharges current from the battery current or is placed in a battery charger that supplies a charging current to the battery. In both situations, it is imperative to immediately wake-up the microprocessor core to detect such current flow for true and accurate gauging of the battery power.

VIII. Inter-Integrated Circuit (I²C) Interface

Microcontroller 10 supports a bi-directional two wire bus and data transmission protocol, with I²C serial interface 58 being usable for communicating with other peripheral or microcontroller devices such as serial EEPROMs, shift registers, display drivers, A/D converters. I²C interface 58 is compatible with I²C bus specifications, the system management bus (SMBUS) and the access bus, the I²C bus being a two-wire serial interface developed by Philips/Signetics. The original specification, or standard mode, for the I²C bus was designed for data transfers up to 100 kilobits per second (Kbps) while an enhanced specification, or fast mode, supports data transmission of up to 400 Kbps; both standard and fast mode devices will inter-operate if attached to the same bus.

Figure 13:
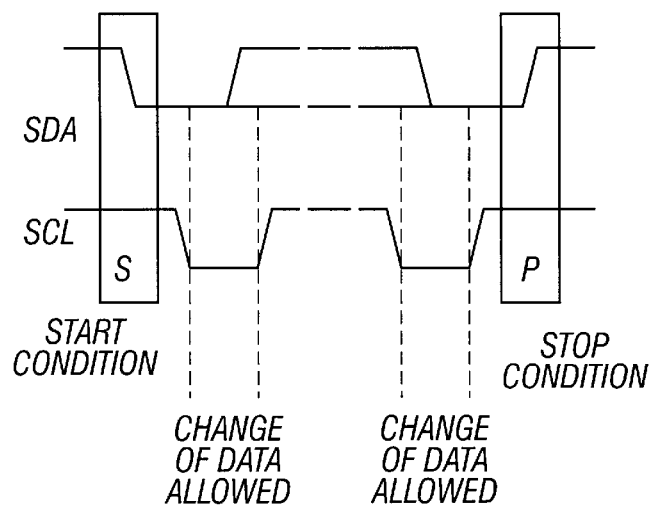
FIG. 13 is a graph illustrating start and stop conditions according to an inter-integrated circuit ($I^2C$) protocol.

The I²C interface protocol for transmission and reception of data includes the following. During times of no data transfer, both the clock line (SCLA) and the data line (SDAA) are pulled high through external pull-up resistors. When transmitting data, one device is the master and generates the clock signal while the other device(s) acts as the slave, each device having a specific address which is transmitted first when a master wishes to initiate a data transfer, after which the slave matching that address is selected for data transfer. The master device generates both start and stop conditions for the data transmission. Referring to FIG. 13, a start condition is defined as a high to low transition, and a stop condition as a low to high transition, on the data line when the clock line is high. Because of this definition, when the data is being transmitted the data line can only change when the clock line is low.

Figure 14:
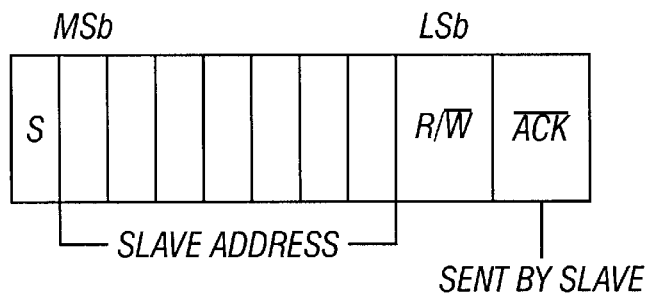
FIGS. 14 and 15 illustrate 7-bit and 10-bit formats, respectively, for addressing $I^2C$ devices.
Figure 15:
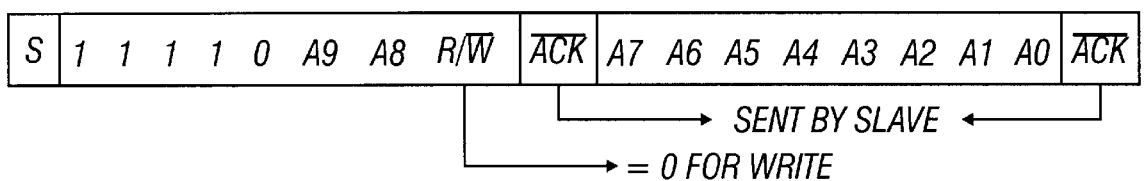

Two addressing formats exist for I²C devices. The first is a 7-bit format shown in FIG. 14, in which, after the start bit (S), 8 bits are generated by the master, the first seven being the address of the slave and the last being a read/write bit. The second is a 10-bit address format shown in FIG. 15, in which, after the start bit, two bytes are generated by the master, the first five bits of the first byte specifying the address to be 10-bits, the next ten bits being the address of the slave and the last being a read/write bit.

Figure 16:
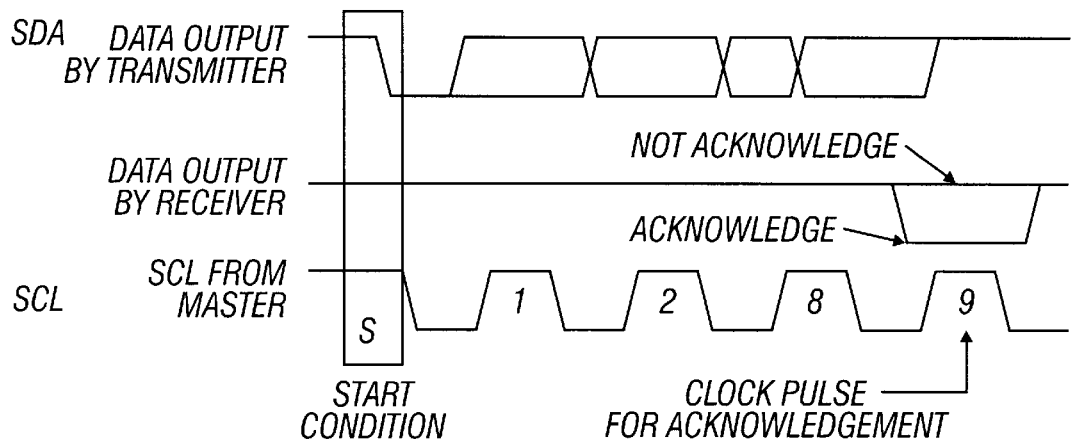
FIG. 16 is a graphical diagram illustrating the generation of an acknowledge by a slave device.

After each byte of transmitted data, the slave/receiver device generates an acknowledge bit as shown in FIG. 16 in which receipt of the last byte of data is acknowledged by the slave holding its data output line low during the clock pulse. For example, for a 7-bit address format, every ninth clock pulse corresponds to an acknowledgment.

Figure 17:
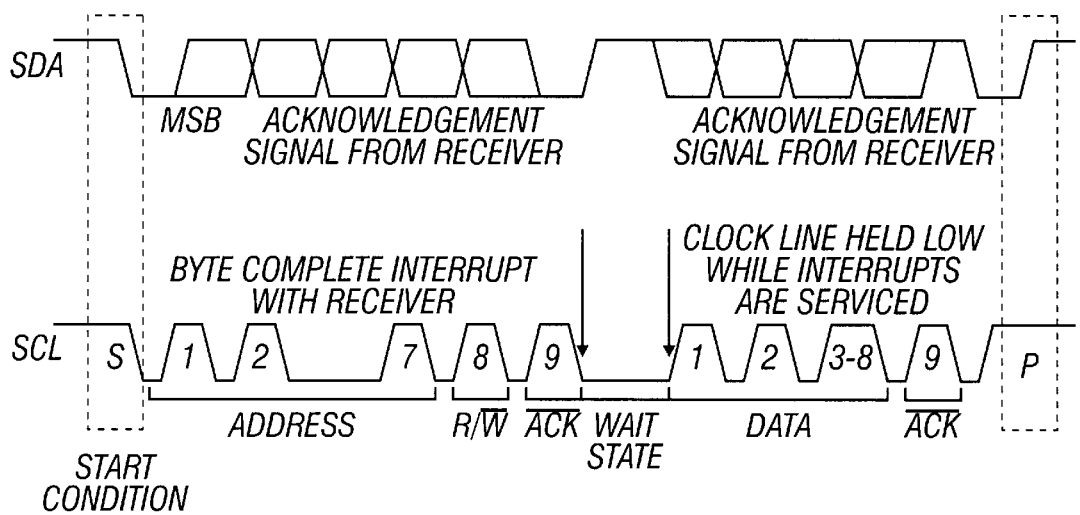
FIG. 17 is a graphical diagram illustrating an example of $I^2C$ data transfer using the 7-bit address format.

FIG. 17 illustrates an example of I²C data transfer using the 7-bit address format. After the start bit (S), the master generates the slave address and a read/write bit, followed by the addressed slave device pulling its data output low to acknowledge. The slave acknowledges each byte of data generated by the master, and when data transfer is completed, the master generates a stop bit (P).

Figure 18:
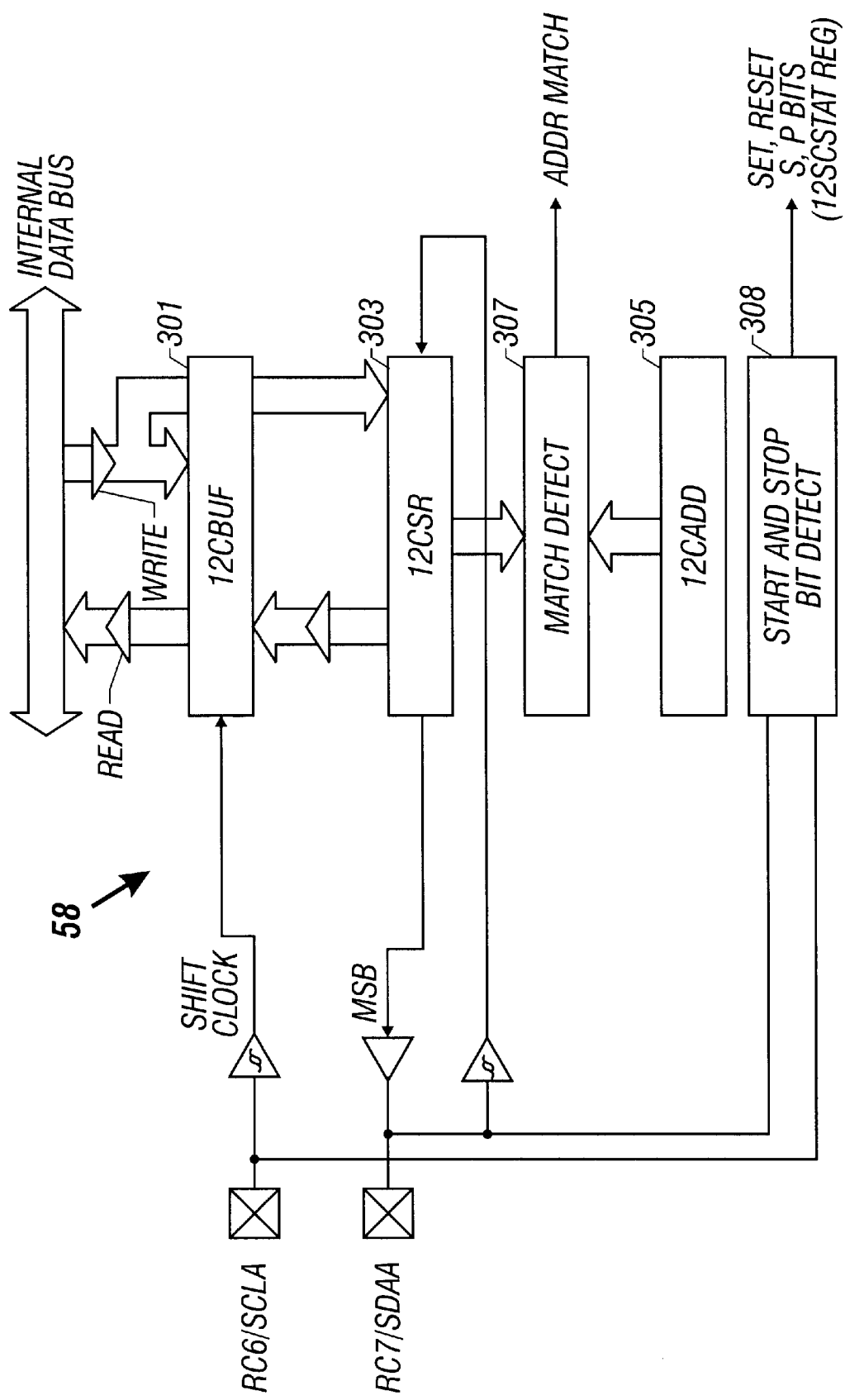
FIG. 18 is a detailed block diagram illustrating the $I^2C$ interface of FIG. 2.

FIG. 18 is a detailed block diagram of I²C interface 58, which fully implements all slave functions and provides hardware support for software implementation of the master functions as well as implementing the standard and fast mode specifications and both 7-bit and 10-bit addressing. Two lines/external pins are used for data transfer: (1) the RC6/SCLA pin for the I²C clock, and (2) the RC7/SDAA pin for the I²C data. I²C interface 58 has 5 registers, viz., (1) a control (I²CCON) register, (2) a status (I²CSTAT) register (both (1) and (2) being located in file register (data) space), (3) a serial receive/transmit buffer (I²CBUF) 301, (4) a shift register (I²CSR) 303, and (5) an address (I²C ADD) register 305 as well as comparator/match detector 307 and start and stop bit detect circuitry 309.

The I²CCON register controls I²C operation and allows selection of slave mode with either 7-bit addressing, 10-bit addressing, 7-bit addressing with master mode support, or 10-bit addressing with master mode support; or of master mode, where slave is idle. The I²CSTAT register is read only and gives the status of the data transfer including information such as the detection of a start or stop bit, if the received byte was data or address, if the next byte is the completion of a 10-bit address, and if this will be a read or a write data transfer. Transfer data is written to or read from the I²CBUF register. The I²CSR register shifts the data into or out of microcontroller 10, and the I²CADD register stores the address of the slave.

Figure 19:
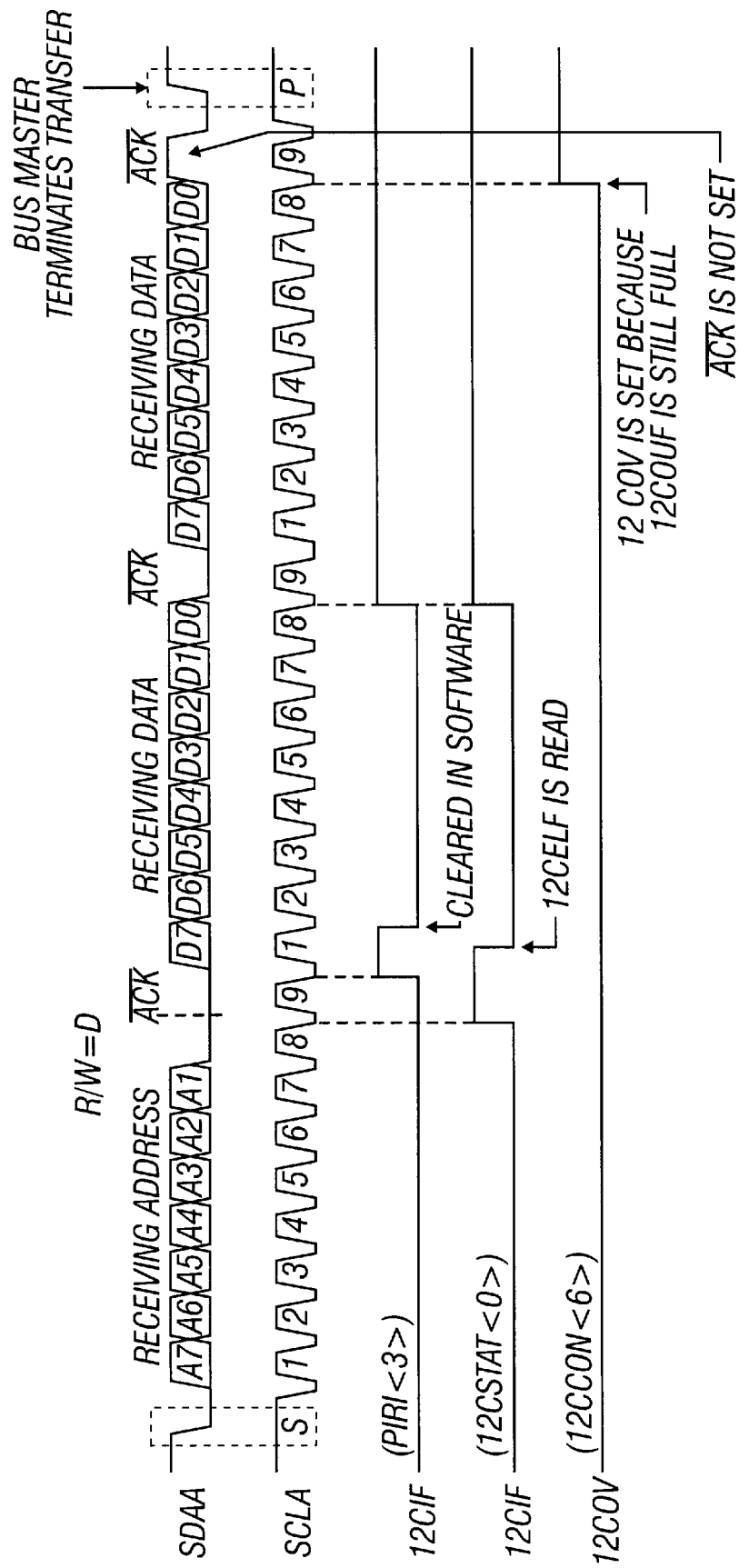
FIG. 19 is a graphical diagram illustrating typical waveforms associated with the $I^2C$ interface for the reception of data.

FIG. 19 illustrates typical waveforms associated with I²C interface 58 for data reception with a 7-bit address format. Once enabled, I²C interface 58 waits for a start condition to occur, after which the 7-bit address and the read/write bit are shifted into I²CSR register 303. All incoming bits are sampled on the rising edge of the serial clock line. The contents of the I²CSR register are compared to the contents of the I²CADD register on the falling edge of the 8th clock pulse and if they match, the contents of the I²CSR register are loaded into the I²CBUF register and the read/write bit of the I2CSTAT register is cleared (to denote that data is being written to interface 58). Also, an acknowledge pulse is generated and a I²C interrupt bit (I2CIF) is set after transfer of each data byte, the interrupt bit being cleared in software and the I2CSTAT register being used to determine the status of the byte. If the I²CBUF register has not been read from the previous reception, an address byte overflow condition exists such condition being denoted by setting an overflow bit (I2COV) in the I2CCON register, and no acknowledge pulse is generated.

Figure 20:
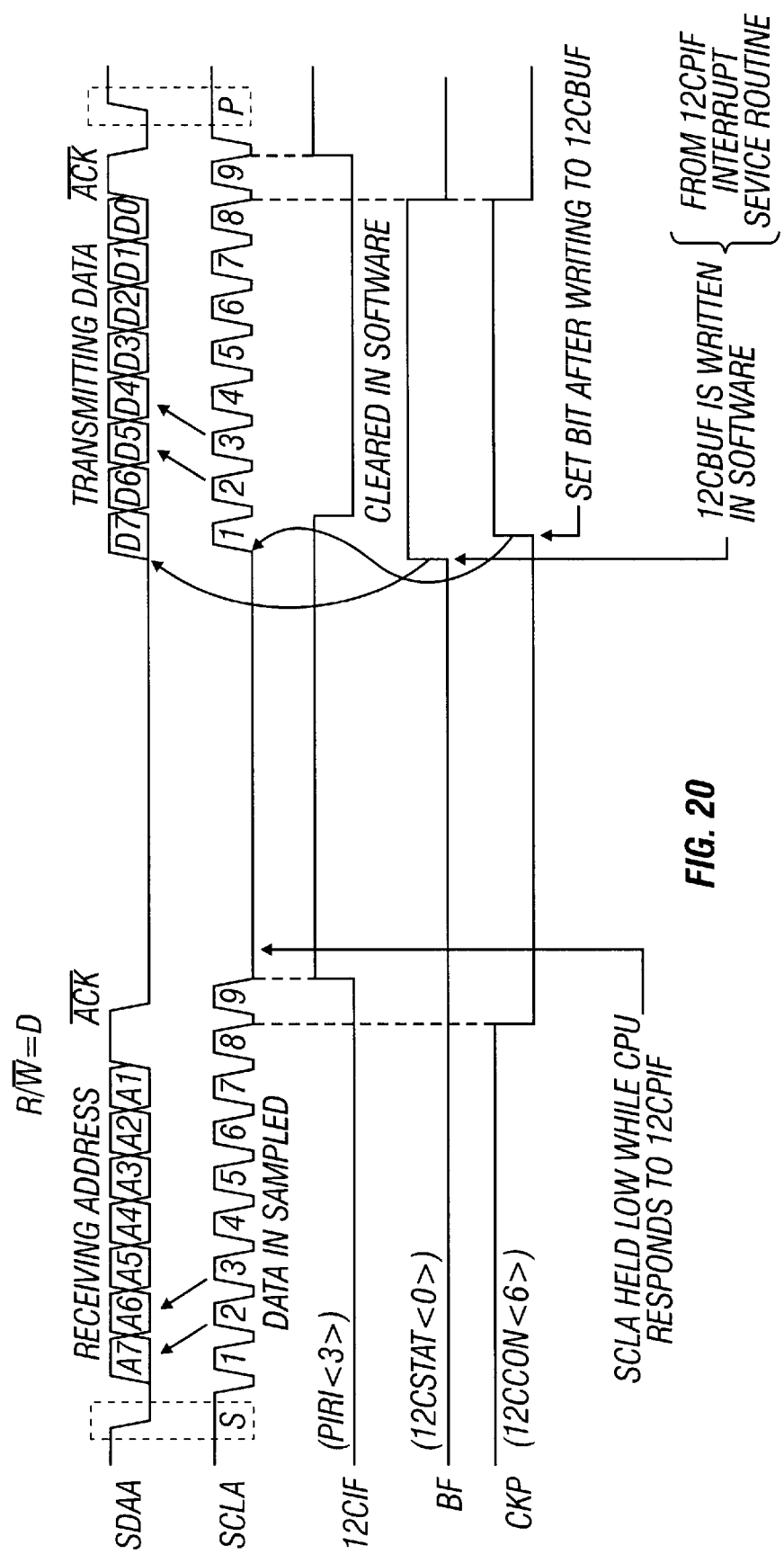
FIG. 20 is a graphical diagram illustrating typical waveforms associated with the $I^2C$ interface for the transmission of data.

FIG. 20 illustrates typical waveforms associated with I²C interface 58 for data transmission with a 7-bit address format. When an address match occurs and the read/write bit of the I²CSTAT register is set (to denote that data is being written from interface 58), the address is loaded into the I²CBUF register and the acknowledge pulse will be generated on the ninth clock pulse. The data to be transmitted must be loaded into the I²CBUF register which also loads the I²CSR register. The 8 bits of data are shifted out on the falling edge of the serial clock line. Similar to reception of data, an I²C interrupt flag (I2CIF) is generated for each data transfer byte, the I²CIF bit is cleared in software and the I²CSTAT register indicates the status of the byte. cl IX. In-Circuit Programming of the Microcontroller By making use of I²C interface 58, microcontroller 10 can be serially programmed while in the end application circuit. Such a feature allows manufacture of boards with un-programmed devices and programming just before shipment, or customer programming of the product in circuit. This allows the most recent firmware or a custom firmware to be programmed.

Microcontroller 10 is placed in a program/verify mode by holding the serial clock and serial data pins low while raising the voltage programming pin to voltage $V_{PP}$ (e.g., 12 volts) with respect to $V_{SS}$. In the program mode, both the user program memory and the test program memory can be accessed and programmed in either serial or parallel fashion, the initial mode of operation being serial and the program memory being accessed.

Figures 21, 22:
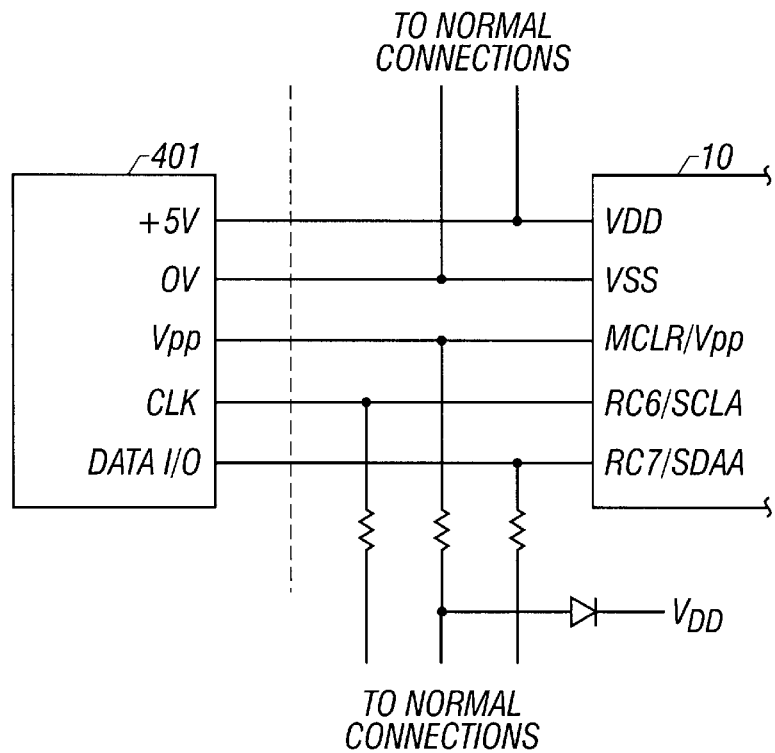
FIG. 21 is a block diagram illustrating a typical in-circuit serial programming connection of the microcontroller of FIG. 1.
FIG. 22 is a table illustrating the different commands available for serial program operation.

In-circuit serial programming is accomplished by utilizing two external pins of microcontroller 10 (the SCLA and SDAA pins) for providing clock and data to and from the microcontroller. Three other pins are utilized for providing power, ground and programming voltage ($V_{PP}$) to the microcontroller. FIG. 21 illustrates a typical in-circuit serial programming configuration of microcontroller 10 in which, by way of example only, the microcontroller resides inside end-circuit/battery pack 403 for use in controlling the charging/monitoring of a battery (not shown in FIG. 21). The portion of microcontroller 10 shown in the Figure includes a portion of its external pins for coupling to external connector 401 of battery pack 403 to enable programming the microcontroller while in the battery pack. External connector 401 receives external signals for supplying clock and serial data signals to the SCLA and SDAA pins, respectively, of microcontroller 10. Connecter 401 also receives and supplies a programming voltage (e.g., 12 volts) to the masterclear (MCLR)/voltage programming pin of the microcontroller 10 to enable its entry into the serial programming mode. Connector 401 supplies +5 volts and ground to external power pins $V_{DD}$ and $V_{SS}$, respectively, of the microcontroller.

FIG. 22 illustrates the different commands available for serial programming. A "load test" command is used for loading a 14-bit word into test program memory; upon receiving this command the program counter is set to a predetermined location in test program memory. A "load data" command is used for loading a 14-bit word into user program memory, and a "read data" command is used for transmitting a 14-bit word out of that memory. An "increment address" command is used for incrementing the program counter of the microcontroller, and a "begin programming" command is used to commence programming of either the test program memory or the user program memory if a load test or a load data command has been given. An "enter parallel mode" command is used for programming the microcontroller to accept data in a parallel mode but such mode is generally not applicable for in-circuit programming because of the typically limited number of external connectors of a battery pack. An "end programming" command is used to stop programming of the program memory.

Figure 23:
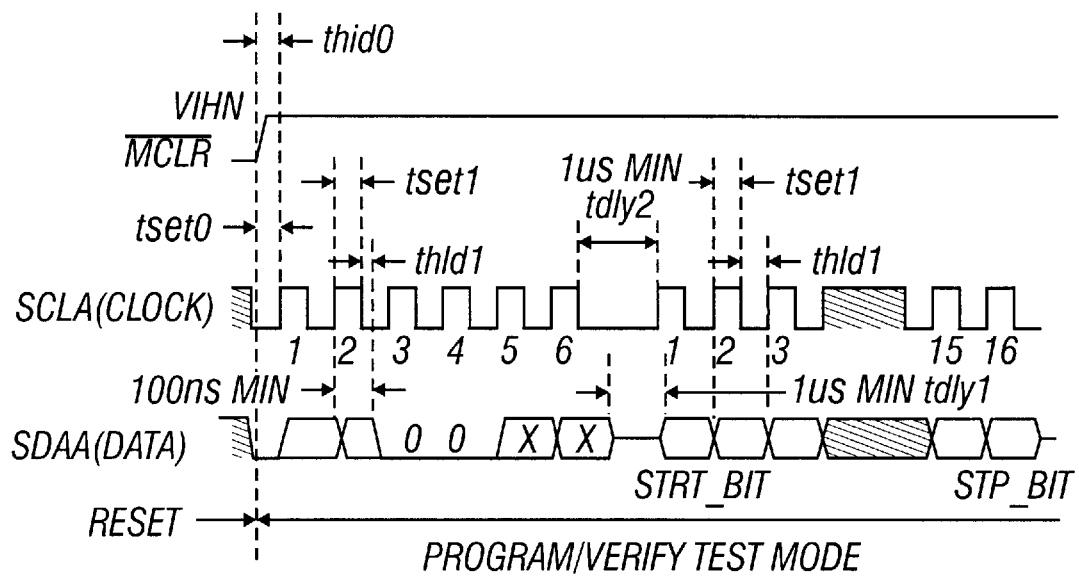
FIGS. 23 and 24 are graphical diagrams illustrating the load data and read data commands, respectively, for serial program operation.
Figure 24:
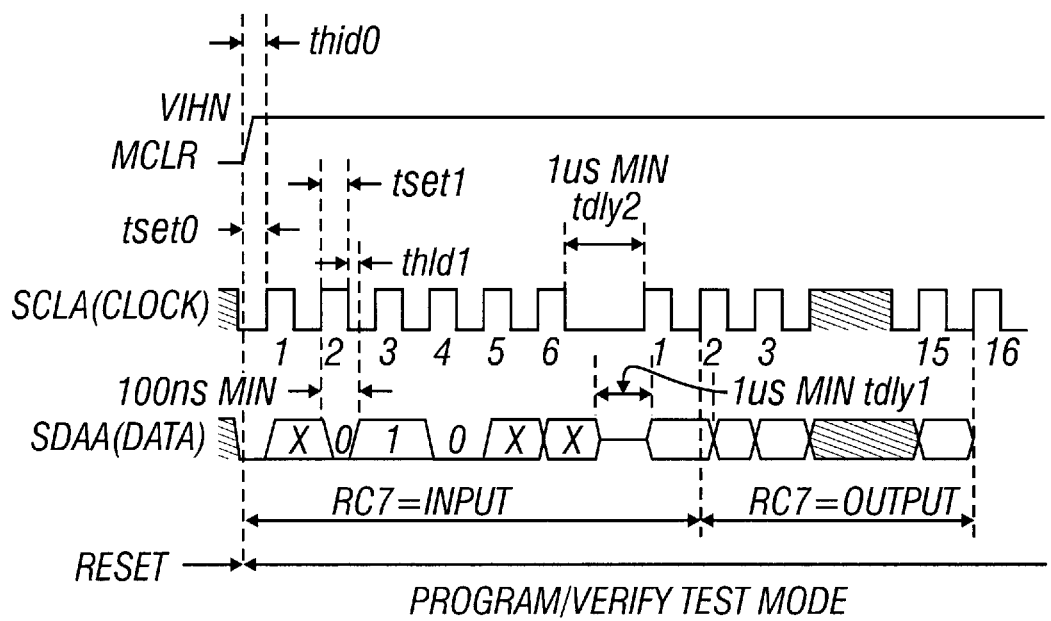

The load data and read data commands for serial program operation are shown in FIGS. 23 and 24, respectively. To input a command, the clock pin is cycled 6 times, each command bit being latched on the falling edge of the clock with the least significant bit (LSB) of the command being input first. The data on the SDAA pin must have a minimum set-up (tset0, tset1) and hold time (thld0, thld1) of 100 nanoseconds, for example, with respect to the falling edge of the clock. Moreover, commands that have data associated with them, such as the read data and load data commands, are specified to have a minimum delay (tdly1) of 1 microsecond, for example, between the command and the data. After this delay, the clock pin is cycled 16 times with the first cycle being a start bit and the last cycle being a stop bit and data being input or output with the middle 14 clock cycles with the LSB being first. During a read operation, the LSB will be transmitted onto the SDAA pin on the rising edge of the second cycle, while during a load operation the LSB will be latched on the falling edge of the second cycle.

X. Battery Monitoring Application

Figure 25:
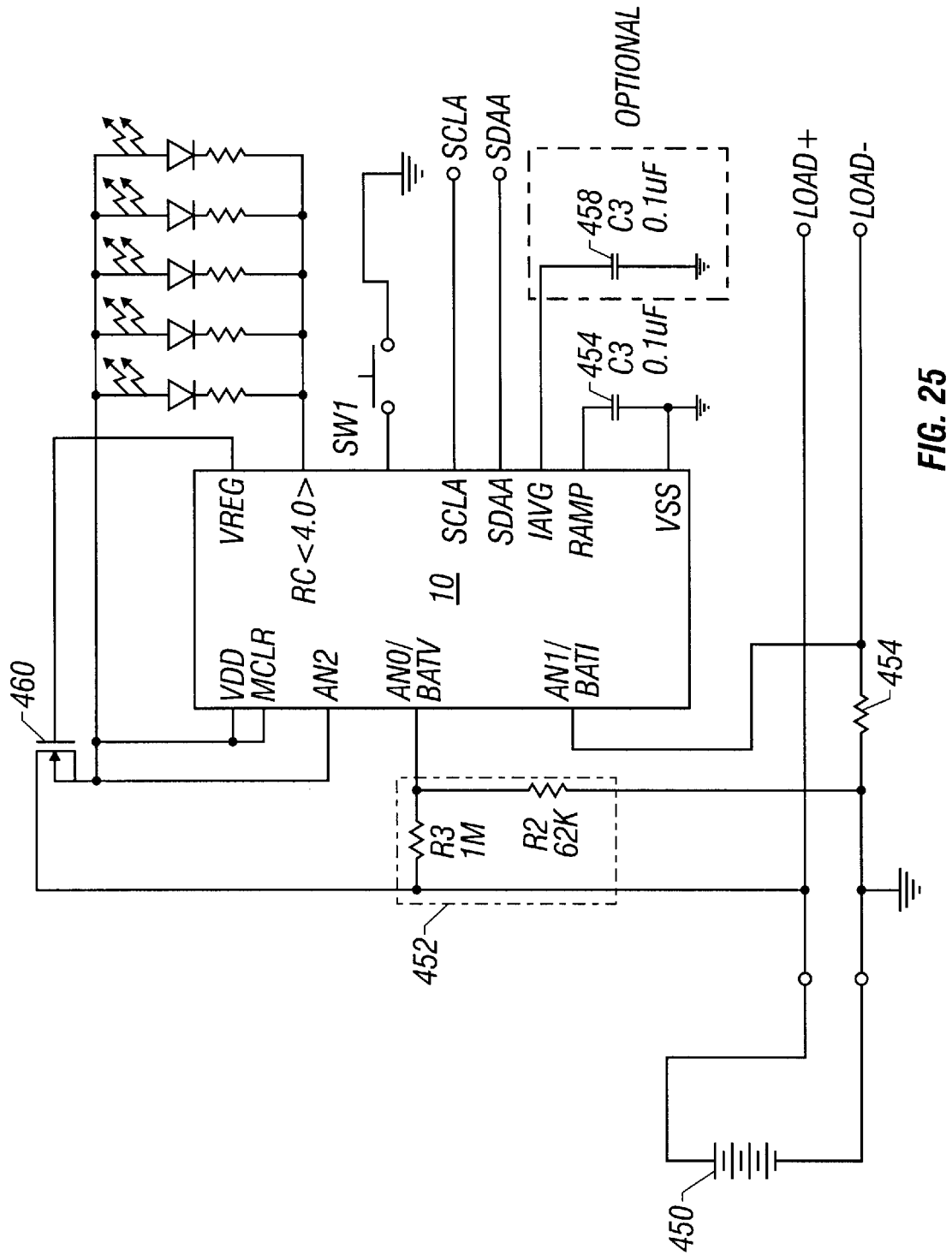
FIG. 25 is a block diagram illustrating the microcontroller of FIG. 1 configured for use in monitoring an external battery.

FIG. 25 illustrates microcontroller 10 configured for use in monitoring external battery 450. The battery voltage is coupled through voltage divider circuit 452 and supplied to the AN0/BATV analog input of the microcontroller, and the battery current passes through sense resistor 454 and a voltage indicative thereof is supplied to the AN1/BATI analog input of the microcontroller. The RAMP pin of microcontroller 10 is coupled through an external capacitor 456 and returned to ground for generating a programmable ramp voltage across the capacitor. The IAVG pin of the microcontroller 10 may be coupled through external capacitor 458 and returned to ground for capturing small duration current pulses. A voltage regulator pin (VREG) is coupled to the gate electrode of an external N-channel FET 460 for providing voltage regulation. The drain electrode of FET 460 is coupled to receive the battery voltage while the source electrode of FET 460 provides a regulated voltage $V_{DD}$ to the microcontroller. The regulated voltage can be measured via external analog input AN2.

Although certain preferred embodiments and methods have been disclosed herein, it will be apparent to those skilled in the art from consideration of the foregoing description that variations and modifications of the described embodiments and methods may be made without departing from the true spirit and scope of the invention. Accordingly, it is intended that the invention shall be limited only to the extent required by the appended claims and the rules and principles of applicable law.

What is claimed is:

1. A semiconductor device for receiving a plurality of continuously variable analog input signals, said device comprising:

a microprocessor for processing signal information;

means for putting the microprocessor in a sleep mode when said microprocessor is not being called upon to process signal information;

means for providing a digitally programmable threshold level;

an external circuit coupled to said device and for providing said plurality of continuously variable analog input signals, wherein each of said plurality of continuously variable analog input signals derived from said external circuit is indicative of a specified monitored circuit function;

means for interleaving said plurality of continuously variable analog input signals in a sequence for application to said device during successive preset time intervals, wherein said sequence represents a respective designated priority of each of said plurality of continuously variable analog input signals indicative of the specified monitored circuit function of said external circuit, so that a degree of control exercised over the external circuit by said device is a function of said designated priority of each of said plurality of continuously variable analog input signals;

means responsive to at least one of said plurality of continuously variable analog input signals reaching the programmed threshold level for awakening the microprocessor from said sleep mode to process information contained in said at least one of said plurality of continuously variable analog input signals; and means responsive to the awakened microprocessor for controlling said external circuit to restore said at least one of said plurality of continuously variable analog input signals to a predetermined level distinct from said threshold level.

2. The semiconductor device of claim 1 wherein the priority of application of said plurality of analog input signals to the device is designated according to a rate of variation of a level of each of said plurality of analog input signals.

3. The semiconductor device of claim 2 wherein said means for awakening the microprocessor from the sleep mode is responsive to the at least one of said plurality of continuously variable analog input signals exceeding the programmed threshold level to initiate the awakening.

4. The semiconductor device of claim 2 wherein said means for awakening the microprocessor from the sleep mode is responsive to the at least one of said plurality of continuously variable analog input signals falling below the programmed threshold level to initiate the awakening.

5. A device-implemented method for awakening a microprocessor from a sleep mode in which said microprocessor is placed when a predetermined interval of time elapses in which the microprocessor is idle in processing a plurality of continuously variable analog input signals being provided to the microprocessor, an external circuit associated with said microprocessor and for providing said plurality of continuously variable analog input signals, each of said plurality of analog input signals derived from said external circuit is indicative of a specified monitored circuit function, the method comprising the steps of:

digitally programming a threshold level at which the microprocessor is to be awakened;

interleaving said plurality of continuously variable analog input signals in a sequence for application to said microprocessor during successive preset time intervals, wherein said sequence represents a respective designated priority of each of said plurality of continuously variable analog input signals indicative of the specified monitored circuit function of said external circuit, so that a degree of control exercised over the external circuit by said microprocessor is a function of said designated priority of each of said plurality of continuously variable analog input signals;

monitoring at least one of said plurality of continuously variable analog input signals to detect whether said at least one of said plurality of continuously variable analog input signals has reached the programmed threshold level;

awakening the microprocessor from said sleep mode to process information contained in the at least one of said plurality of continuously variable analog input signals when said at least one of said plurality of continuously variable analog input signals reaches the programmed threshold level; and responding to the awakened microprocessor for controlling said external circuit to restore said at least one of said plurality of continuously variable analog input signals to a predetermined level distinct from said programmed threshold level.

6. The method of claim 5 including the step of designating the priority of application of said plurality of continuously variable analog input signals to the microprocessor according to a rate of variation of a level of each of said plurality of continuously variable analog input signals.

7. The method of claim 6 wherein the step of awakening the microprocessor from the sleep mode is performed in response to receipt of the level of the at least one of said plurality of continuously variable analog input signals exceeding the programmed threshold level.

8. The method of claim 6 wherein the step of awakening the microprocessor from the sleep mode is performed in response to receipt of the level of the at least one of said plurality of continuously variable analog input signals falling below the programmed threshold level.

9. A microcontroller for battery charging and performance monitoring applications, including a microprocessor to execute programs and instructions and to generate control signals in response thereto for selectively controlling an external electrical device powered by a rechargeable battery to efficiently maintain power-delivering characteristics and longevity of the battery, memory means for storing programs to be executed by the microprocessor in conjunction with signal information contained in a plurality of continuously variable analog input signals provided to the microcontroller from respective different performance parameters of the battery and the external electrical device related thereto, and means, responsive to prolonged idleness of the microprocessor in performing program execution function, for placing the microprocessor in a sleep mode to conserve electrical energy of the microcontroller; the microcontroller further comprising:

means for selectively applying the plurality of analog input signals in a predetermined interleaved sequence in which at least some of the plurality of analog input signals are designated as having priority over others of said plurality of analog input signals based on rate of variation of the signal information contained therein, and are applied more frequently to said microcontroller than said others of said plurality of analog input signals for greater influence on a degree of monitoring and control exercised by the microcontroller over the battery and the external electrical device;

means responsive to the plurality of analog input signals for leaving the microprocessor in the sleep mode or awakening the microprocessor therefrom to initiate a selected control function, according to respective levels of the plurality of analog input signals relative to a predetermined threshold level; and means for digitally programming the threshold level to designate a point at which the selected control function will be initiated.

10. The microcontroller of claim 9 wherein said selected control function includes monitoring an output current or voltage of the battery during operation of the external electrical device, to provide a fuel gauge function representing an accurate measurement of a present level of charge of the battery.

11. The microcontroller of claim 10 wherein said selected control function further includes halting a delivery of charging current to the battery when the level of charge on the battery exceeds a predetermined value.

12. The microcontroller of claim 9 wherein said means for awakening the microprocessor is responsive to the respective levels of the plurality of analog input signals exceeding the predetermined threshold level.

13. The microcontroller of claim 9 wherein said means for awakening the microprocessor is responsive to the respective levels of the plurality of analog input signals falling below the predetermined threshold level.

* * * * *